(12) United States Patent
Shimizu et al.

(10) Patent No.: US 10,498,554 B2
(45) Date of Patent: Dec. 3, 2019

(54) INFORMATION PROCESSING SYSTEM, METHOD THEREOF, AND MANAGEMENT APPARATUS

(71) Applicant: FUJITSU LIMITED, Kawasaki-shi, Kanagawa (JP)

(72) Inventors: Toshihiro Shimizu, Kawasaki (JP); Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 33 days.

(21) Appl. No.: 16/003,784

(22) Filed: Jun. 8, 2018

(65) Prior Publication Data

US 2018/0359114 A1    Dec. 13, 2018

(30) Foreign Application Priority Data

Jun. 13, 2017    (JP) ................................ 2017-116260

(51) Int. Cl.
*H04L 12/44*    (2006.01)
*H04L 12/751*    (2013.01)

(52) U.S. Cl.
CPC .............. *H04L 12/44* (2013.01); *H04L 45/02* (2013.01)

(58) Field of Classification Search
None
See application file for complete search history.

(56) References Cited

U.S. PATENT DOCUMENTS

2012/0106556 A1    5/2012    Naruse
2013/0022047 A1    1/2013    Nakashima et al.

FOREIGN PATENT DOCUMENTS

JP    2012-098881    5/2012
JP    2013-025505    2/2013

OTHER PUBLICATIONS

V. Moser et al., "Recursively Scalable Fat-Trees as Interconnection Networks", IEEE 13th Annual International Phoenix Conference on Computers and Communications, 1994 (8 pages).

*Primary Examiner* — Kevin C. Harper
*Assistant Examiner* — Derrick V Rose
(74) *Attorney, Agent, or Firm* — Fujitsu Patent Center

(57) ABSTRACT

An information processing system includes switches coupled to each other in a form of a Latin square fat-tree and apparatuses coupled to the switches. A processor of a first apparatus coupled to one of first switches executes a first reduce with others of the first apparatuses. A processor of a second apparatus coupled to a representative switch executes a second reduce with representative apparatuses of respective switches belonging to a group corresponding to the second apparatus. The processor of the second apparatus executes Allreduce with others of the second apparatuses and transmits the result of the Allreduce to the representative apparatuses of the respective switches belonging to the group corresponding to the second apparatus. A processor of a representative apparatus that receives the result of the Allreduce transmits the result of the Allreduce to others of apparatuses coupled to a switch to which the representative apparatus is coupled.

11 Claims, 51 Drawing Sheets

FIG.18

| PHASE | P(2, 2) | P(2, 1) | ... |
|---|---|---|---|
| 1 | n222 → n221<br>n224 → n223 | n212 → n211<br>n214 → n213 | ... |
| 2 | n223 → n221 | n213 → n211 | ... |

FIG.23

| PHASE | L(2) | L(1) | ... |
|---|---|---|---|
| 1 | n201 → n4<br>n221 → n211 | n101 → n3<br>n121 → n111 | ... |
| 2 | n211 → n4 | n111 → n3 | ... |

FIG.33

| PHASE | COMMUNICATION 1 | COMMUNICATION 2 |
|---|---|---|
| 1 | (n1, n2) | (n3, n4) |
| 2 | (n1, n3) | (n2, n4) |

FIG.37

| PHASE | L(2) | L(1) | ... |
|---|---|---|---|
| 1 | n4 → n211 | n3 → n111 | ... |
| 2 | n4 → n201<br>n211 → n221 | n3 → n101<br>n111 → n121 | ... |

FIG.42

| PHASE | P(2, 2) | P(2, 1) | ... |
|---|---|---|---|
| 1 | n221 → n223 | n211 → n213 | ... |
| 2 | n221 → n222<br>n223 → n224 | n211 → n212<br>n213 → n214 | ... |

■ : Spine SWITCH

□ : Leaf SWITCH

○ : SERVER

INFORMATION PROCESSING SYSTEM, METHOD THEREOF, AND MANAGEMENT APPARATUS

CROSS-REFERENCE TO RELATED APPLICATION

This application is based upon and claims the benefit of priority of the prior Japanese Patent Application No. 2017-116260, filed on Jun. 13, 2017, the entire contents of which are incorporated herein by reference.

FIELD

The embodiment discussed herein is related to an information processing system, a method thereof, and a management apparatus.

BACKGROUND

If the efficiency of communication in a parallel computer is increased by optimization of a coupling mode (for example, network topology) of a server and a switch in the parallel computer, the throughput of parallel distributed processing executed by the parallel computer may be improved. Further, if a great number of servers may be coupled by a small number of switches by optimization of the network topology in a parallel computer, the construction cost of the parallel computer may be suppressed.

A network topology called Latin square fat-tree is known. The Latin square fat-tree has a characteristic that only one route through a Spine switch exists between two arbitrary different Leaf switches. If the Latin square fat-tree is used, a great number of servers may be coupled by a same number of switches in comparison with a two-stage fat-tree.

In a parallel computer, collective communication called Allreduce communication is executed. The Allreduce communication is communication in which a result of arithmetic operation executed using data all target nodes have is shared by all target nodes, and Allreduce signifies the arithmetic operation. If Allreduce by all servers of a system that adopts the Latin square fat-tree (the system is hereinafter referred to as Latin square fat-tree system) may be implemented, parallel distributed processing that uses a greater number of servers may be executed.

Related techniques are disclosed in, for example, M. Valerio, L. E. Moser and P. M. Melliar-Smith, "Recursively Scalable Fat-Trees as Interconnection Networks," IEEE 13th Annual International Phoenix Conference on Computers and Communications, 1994.

SUMMARY

According to an aspect of the present invention, provided is an information processing system including a plurality of switches coupled to each other in a form of a Latin square fat-tree and a plurality of information processing apparatuses individually coupled to any one of the plurality of switches and each including a processor. The processor is configured to execute, in a case where the processor is included in one of first information processing apparatuses coupled to one of first switches, a first reduce of performing a predetermined operation with others of the first information processing apparatuses. A result of the first reduce is had by a representative information processing apparatus of the first information processing apparatuses. The first switches are different from a representative switch corresponding to a specific one point on a finite projection plane corresponding to the Latin square fat-tree. The processor is configured to execute, in a case where the processor is included in one of second information processing apparatuses coupled to the representative switch, a second reduce of performing the predetermined operation with representative information processing apparatuses of respective switches belonging to a group corresponding to the one of the second information processing apparatuses. A result of the second reduce is had by the one of the second information processing apparatuses; The processor is configured to execute, in a case where the processor is included in the one of the second information processing apparatuses, Allreduce of performing the predetermined operation with others of the second information processing apparatuses based on the result of the second reduce. A result of the Allreduce is had by the one of the second information processing apparatuses. The processor is configured to transmit, in a case where the processor is included in the one of the second information processing apparatuses, the result of the Allreduce to the representative information processing apparatuses of the respective switches belonging to the group corresponding to the one of the second information processing apparatuses. The processor is configured to transmit, in a case where the processor is included in one of the representative information processing apparatuses that receive the result of the Allreduce, the result of the Allreduce to others of information processing apparatuses coupled to a switch to which the one of the representative information processing apparatuses is coupled.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 1 to 4B are views illustrating Allreduce communication;

FIG. 18 is a view depicting an example of a first communication table;

FIG. 23 is a view depicting an example of a second communication table;

FIGS. 25A to 29 are views illustrating Allreduce between servers coupled to a Leaf switch;

FIG. 33 is a view depicting an example of a third communication table;

FIG. 37 is a view depicting an example of a fourth communication table;

FIG. 42 is a view depicting an example of a fifth communication table;

DESCRIPTION OF EMBODIMENT

Figure 1:
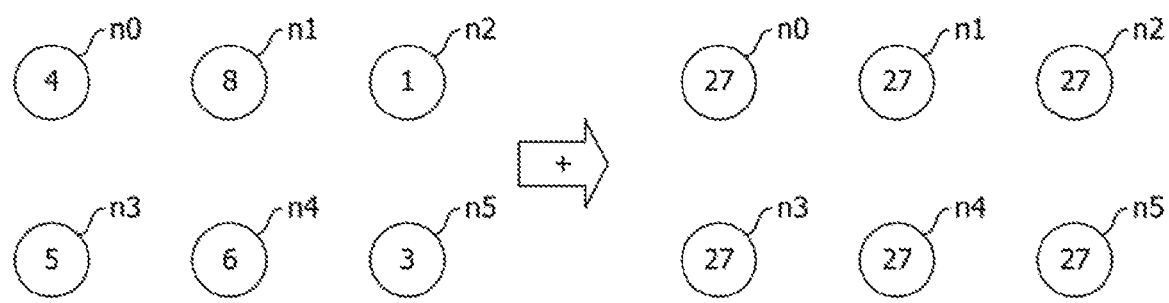

FIGS. 1 to 4B are views illustrating Allreduce communication. In FIG. 1, a server n0, a server n1, a server n2, a server n3, a server n4 and a server n5 have a value "4," a value "8," a value "1," a value "5," a value "6" and a value "3," respectively. Where arithmetic operation designated in Allreduce is "addition," the servers n0 to n5 individually have a value "27."

Figure 2:
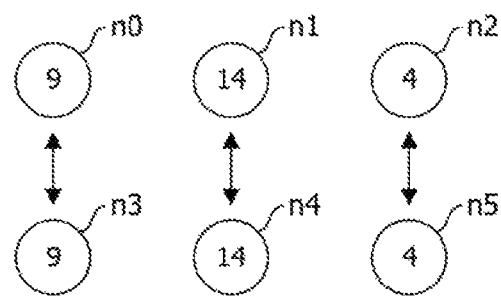
Figure 2:
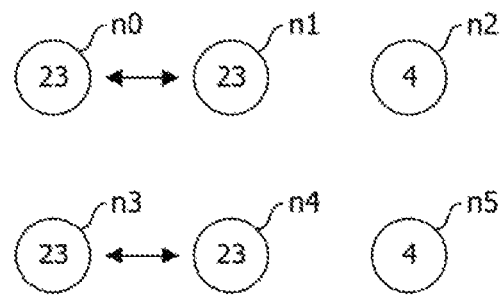
Figure 3:
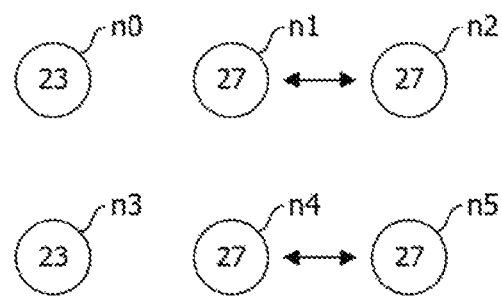
Figure 3:
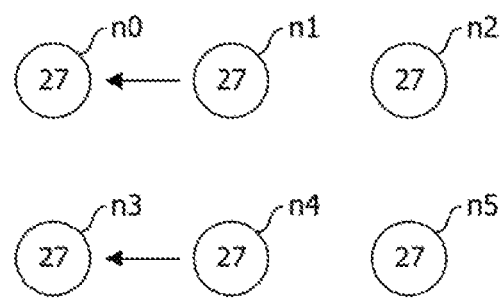
Figure 4:
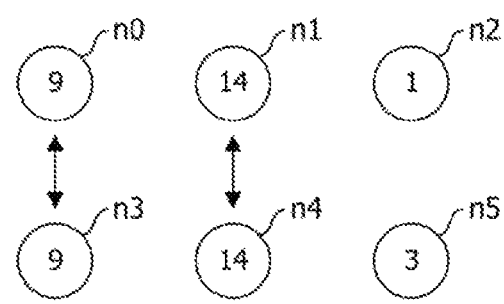
Figure 4:
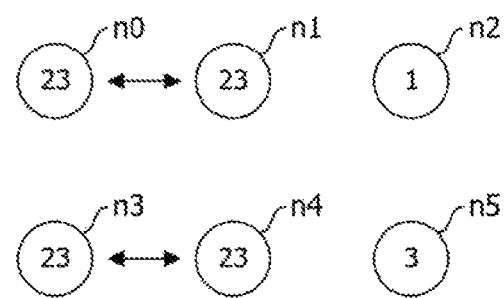

The Allreduce communication for implementing a state indicated on the right side in FIG. 1 is performed, for example, as depicted in FIGS. 2A to 3B. First, as depicted in FIG. 2A, values are shared between the server n0 and the server n3 and the value "9" is calculated by addition, and values are shared between the server n1 and the server n4 and the value "14" is calculated by addition. Further, values are shared between the server n2 and the server n5 and the value "4" is calculated by addition.

Then, as depicted in FIG. 2B, values are shared between the server n0 and the server n1 and the value "23" is calculated by addition, and values are shared between the server n3 and the server n4 and the value "23" is calculated by addition.

Then, as depicted in FIG. 3A, values are shared between the server n1 and the server n2 and the value "27" is calculated by addition and values are shared between the server n4 and the server n5 and the value "27" is calculated by addition.

Finally, as depicted in FIG. 3B, the server n1 transmits the value "27" to the server n0 and the server n4 transmits the value "27" to the server n3. Consequently, as depicted in FIG. 3B, the servers n0 to n5 may have the value "27."

Here, a target may be all or part of the servers n0 to n5. As an example, Allreduce communication in the case in which the servers n0, n1, n3 and n4 are a target is described. First, as depicted in FIG. 4A, values are shared between the server n0 and the server n3 and the value "9" is calculated by addition, and values are shared between the server n1 and the server n4 and the value "14" is calculated by addition.

Then, as depicted in FIG. 4B, values are shared between the server n0 and the server n1 and the value "23" is calculated by addition, and values are shared between the server n3 and server n4 and the value "23" is calculated by addition. Consequently, the servers n0, n1, n3 and n4 may have the value "23."

Figure 5:
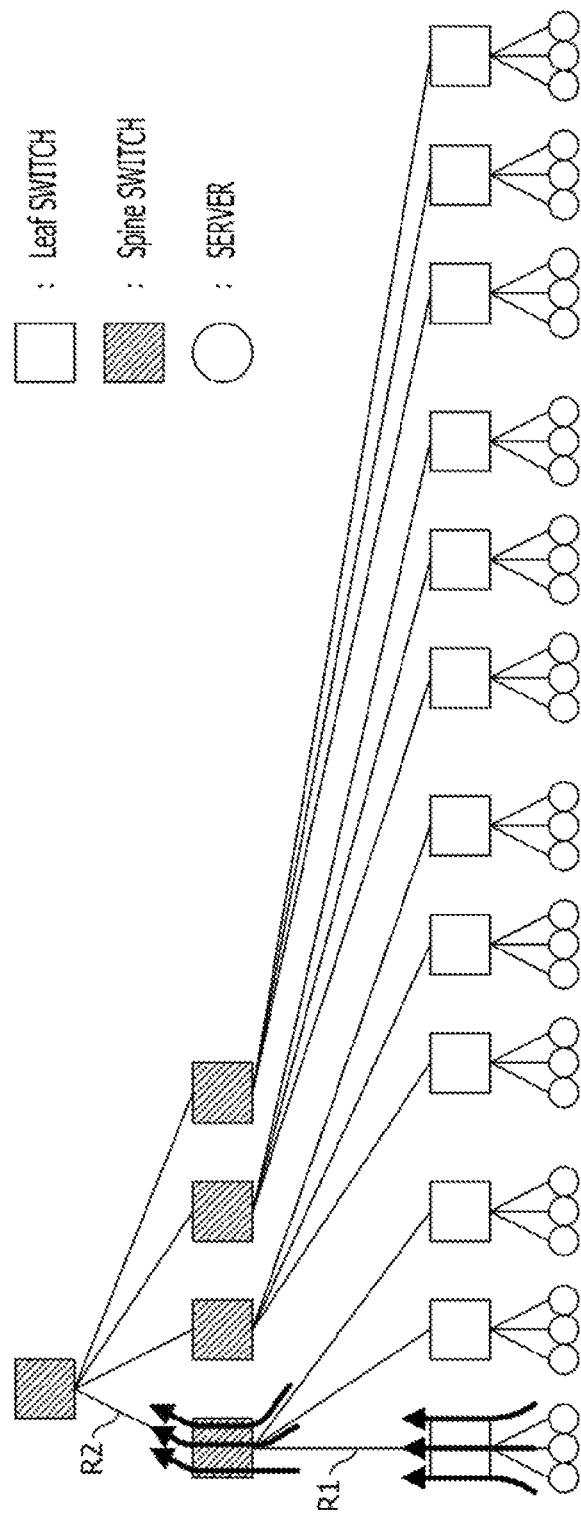
FIG. 5 is a view illustrating route competition in a case where Allreduce communication is executed in a topology of a tree structure.
Figure 6:
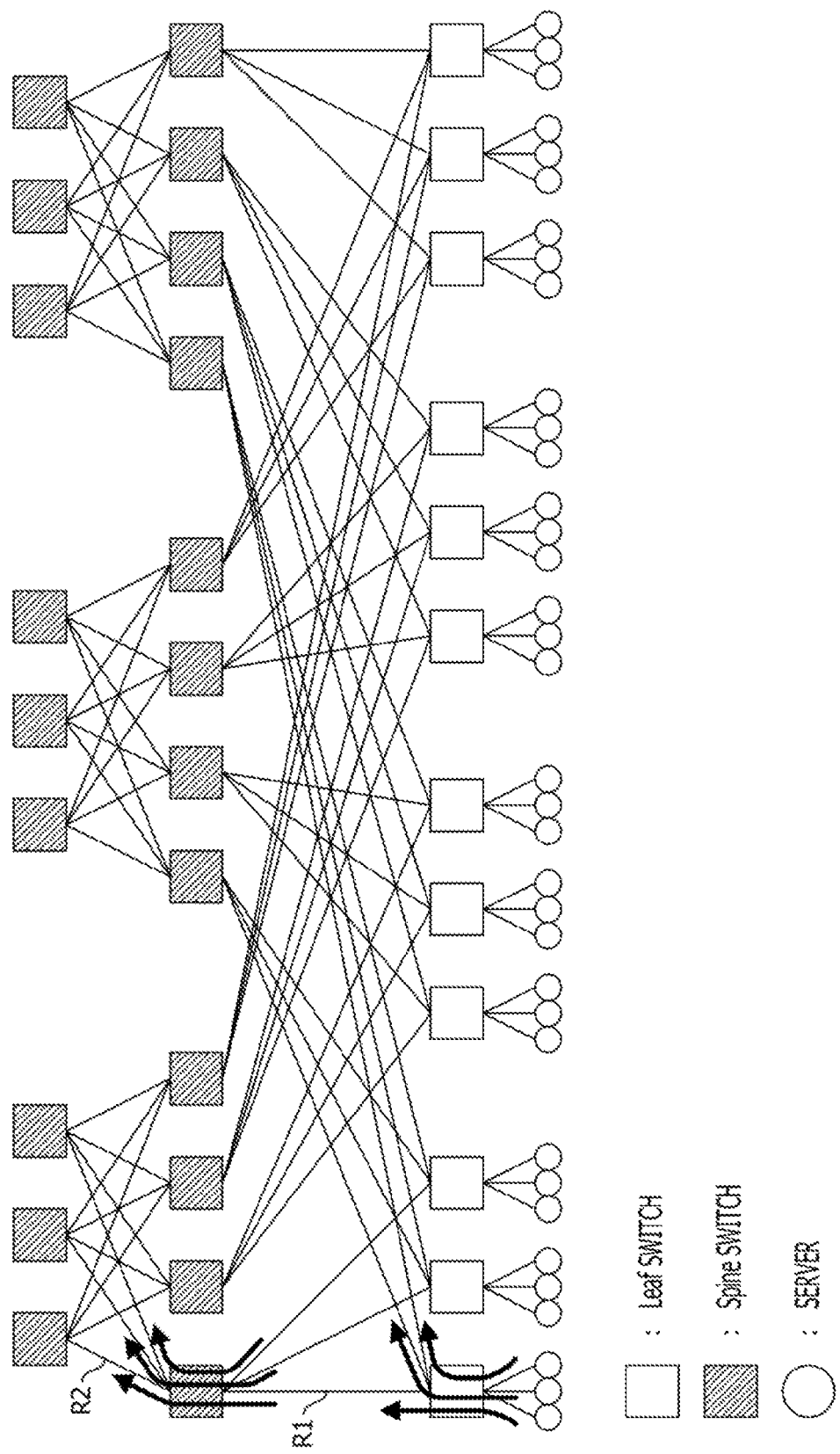
FIG. 6 is a view illustrating route competition in a case where Allreduce communication is executed in a topology of a fat-tree structure.

In the present embodiment, it is intended not to allow route competition to occur in the case where such Allreduce communication as described above is executed by all servers in the Latin square fat-tree system. Here, the route competition signifies that a plurality of packets are transmitted at the same time in the same direction of one route, and the communication time period is elongated by occurrence of route competition. As an example, route competition in the case where Allreduce communication is executed in a topology of a tree structure is depicted in FIG. 5. In FIG. 5, a round mark, a square mark that is not hatched and a square mark that is hatched represent a server, a Leaf switch and a Spine switch, respectively. In FIG. 5, route competition occurs on a route R1 and route competition occurs also on a route R2. In this case, it is possible to suppress route competition by changing the tree structure to a fat-tree structure, for example, as depicted in FIG. 6. However, if the fat-tree structure is adopted, the total number of switches increases from that in the example of FIG. 5.

Figure 7:
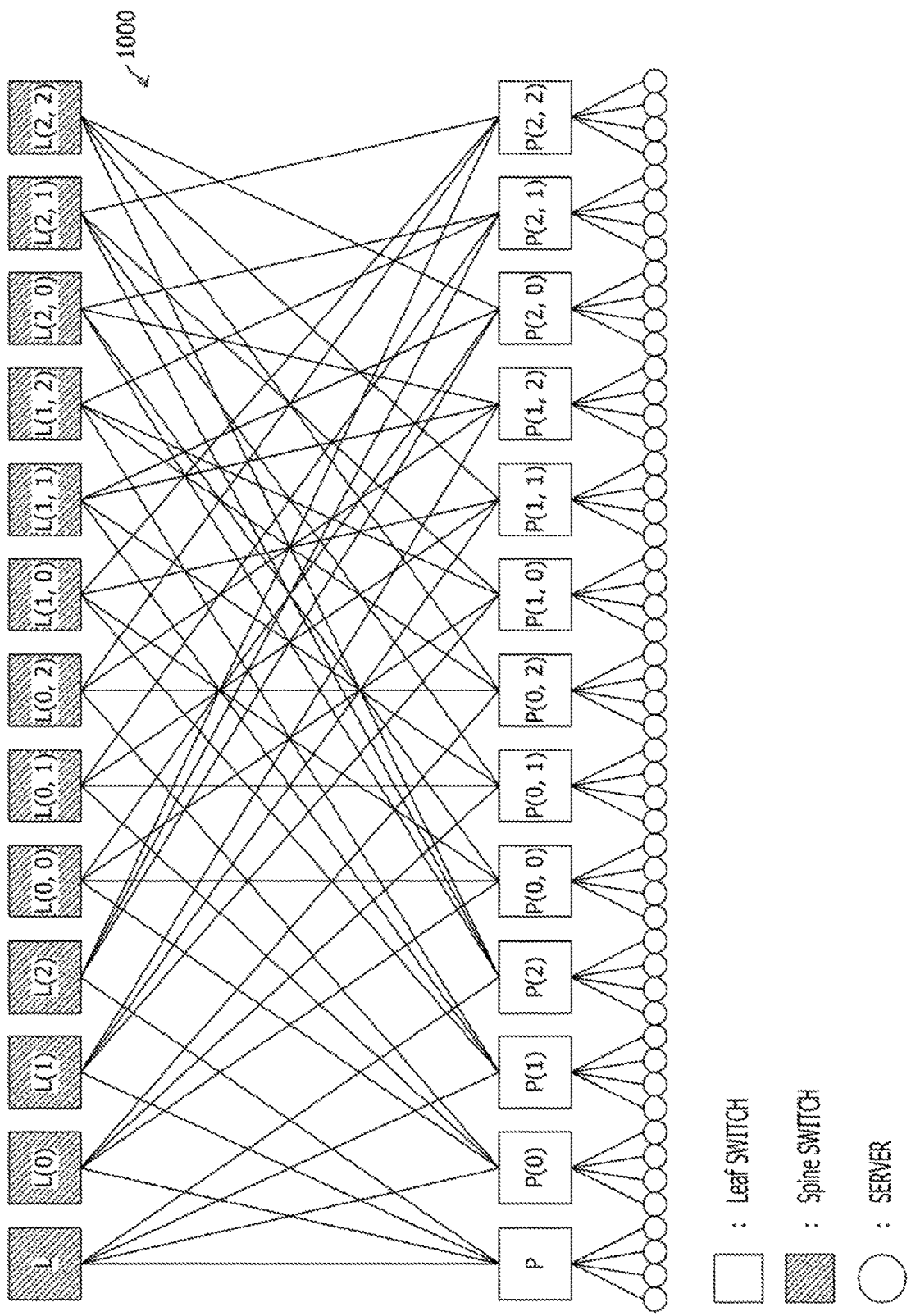
FIG. 7 is a view depicting an overview of a Latin square fat-tree system of an embodiment.

FIG. 7 is a view depicting a Latin square fat-tree system of the present embodiment. In the present embodiment, the coupling form between 13 Spine switches and 13 Leaf switches is a Latin square fat-tree. Since four servers are coupled to each Leaf switch, a Latin square fat-tree system 1000 includes 52 servers that execute parallel distributed processing. The Spine switches and the Leaf switches are each, for example, an InfiniBand switch. Each server is, for example, a physical server. In the following description, it is assumed that the number of servers coupled to each Leaf switch is d. In the present embodiment, d=4.

It is to be noted that, while the number of Spine switches and the number of Leaf switches are 13 in the example of FIG. 7, the number of Spine switches and Leaf switches may be any other than 13. For other examples, refer to the Appendix below.

Figure 8:
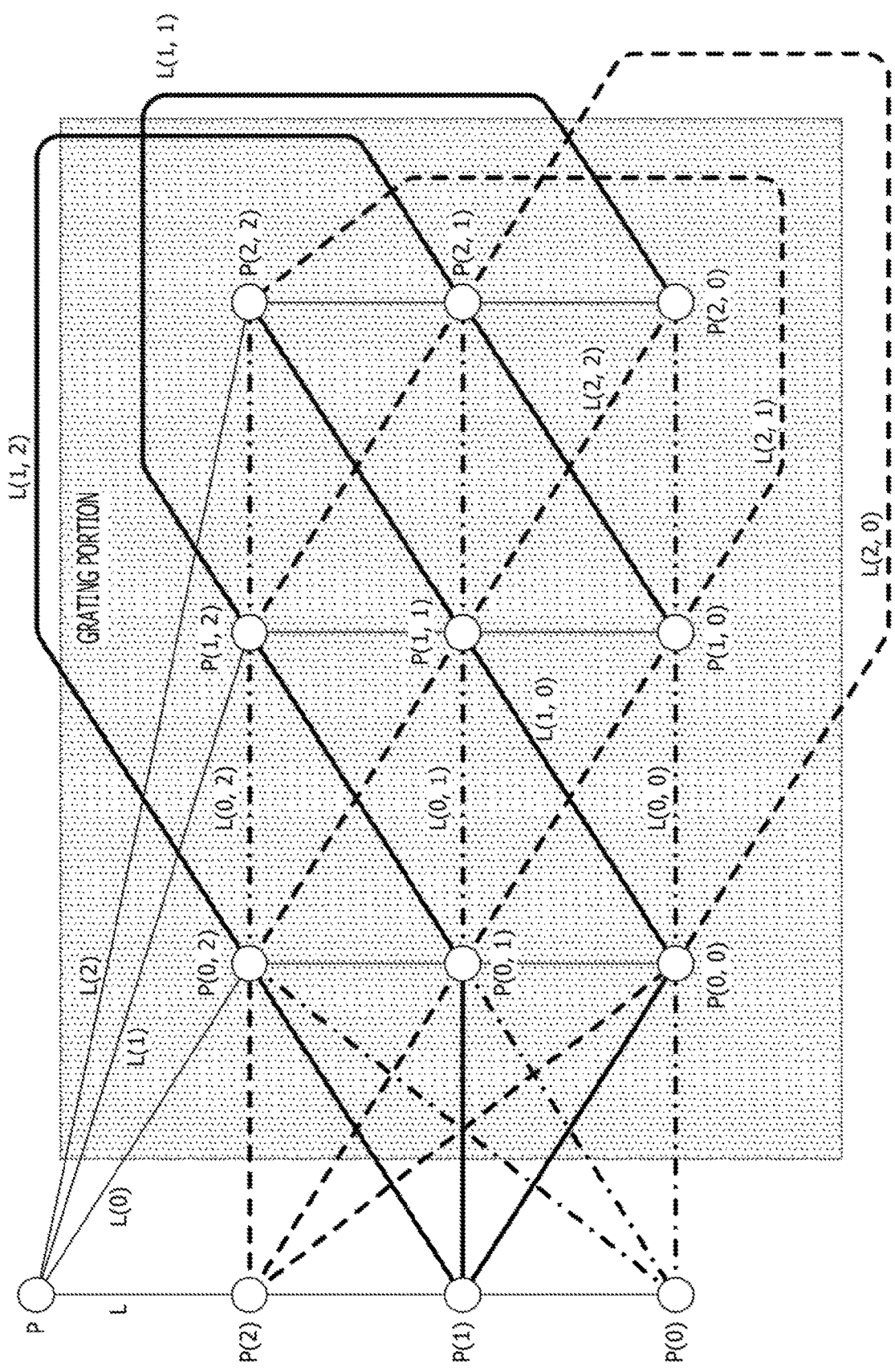
FIG. 8 is a view depicting a finite projection plane.

In FIG. 7, a character string representing points on a finite projection plane corresponding to the Latin square fat-tree depicted in FIG. 7 is applied to each of the Spine switches and each of the Leaf switches. FIG. 8 is a view depicting a finite projection plane corresponding to the Latin square fat-tree depicted in FIG. 7. The order n of the finite projection plane depicted in FIG. 8 is 3, and the number of ports of each Spine switch and each Leaf switch is 8. A round mark represents a Leaf switch and a linear line represents a Spine switch. In the case where such a grating portion as depicted in FIG. 7 is determined, a Leaf switch P, another Leaf switch P(0), a further Leaf switch P(1) and a still further Leaf switch P(2) correspond to infinite points. It is to be noted that, for the finite projection plane, refer to the Appendix below.

Figure 9:
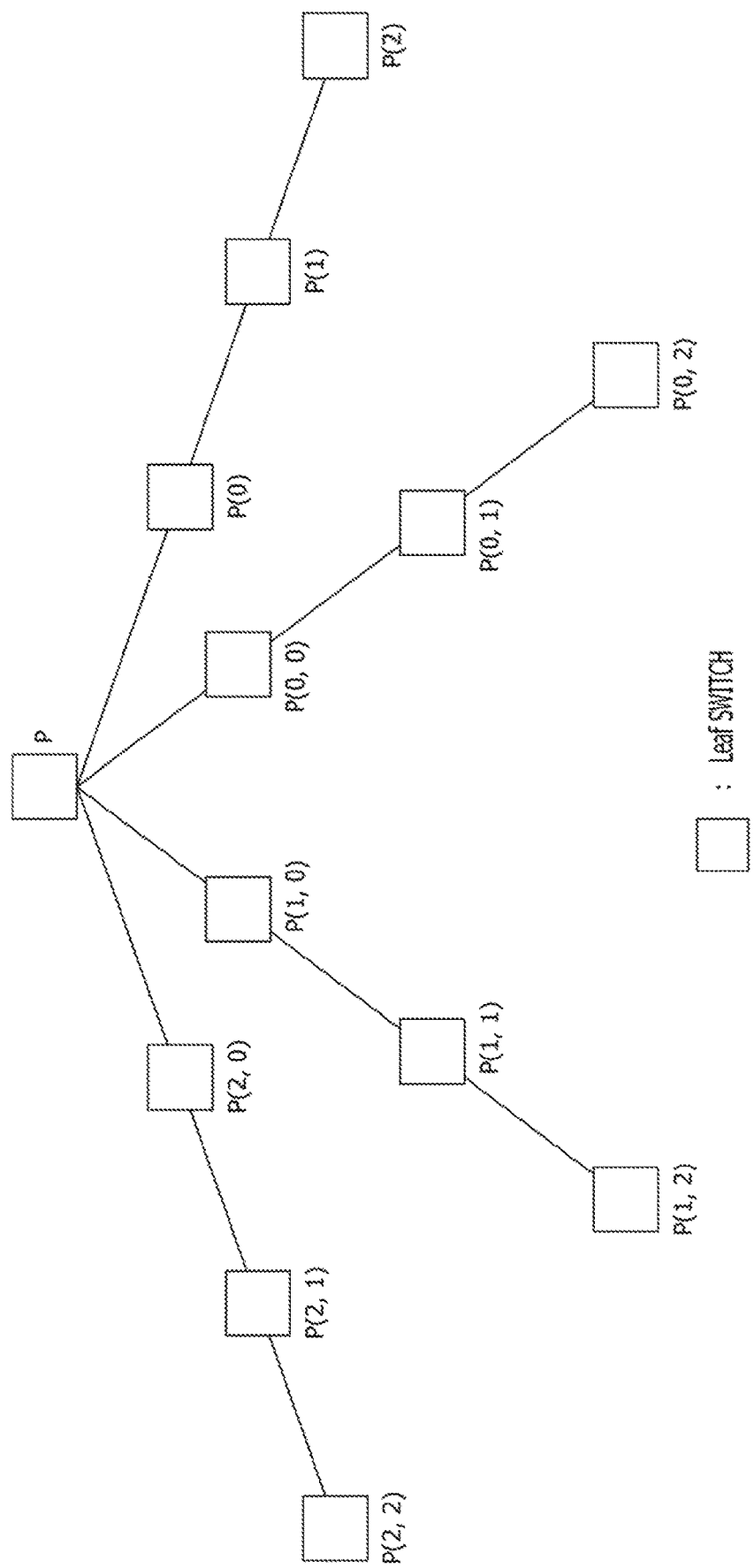
FIG. 9 is a view depicting a Latin square fat-tree system of the present embodiment in a different form.

FIG. 9 is a view depicting the Latin square fat-tree system 1000 in the present embodiment in a different form. In FIG. 9, a square mark represents a Leaf switch and a linear line represents a Spine switch. A linear line that couples a Leaf switch P, another Leaf switch P(2, 0), a further Leaf switch P(2, 1) and a still further Leaf switch P(2, 2) to each other corresponds to a Spine switch L(2). A linear line that couples the Leaf switch P, another Leaf switch P(1, 0), a further Leaf switch P(1, 1) and a still further Leaf switch P(1, 2) to each other corresponds to another Spine switch L(1). A linear line that couples the Leaf switch P, another Leaf switch P(0, 0), a further Leaf switch P(0, 1) and a still further Leaf switch P(0, 2) to each other corresponds to a further Spine switch L(0). A linear line that couples the Leaf switch P, another Leaf switch P(0), a further Leaf switch P(1) and a still further Leaf switch P(2) to each other corresponds to a still further Spine switch L. Illustration of the other Spine switches L(0, 0), L(0, 1), L(0, 2), L(1, 0), L(1, 1), L(1, 2), L(2, 0), L(2, 1) and L(2, 2) is omitted. In order to make the description easy to understand, communication is described below in regard to the Latin square fat-tree in the form depicted in FIG. 9.

Figure 10:
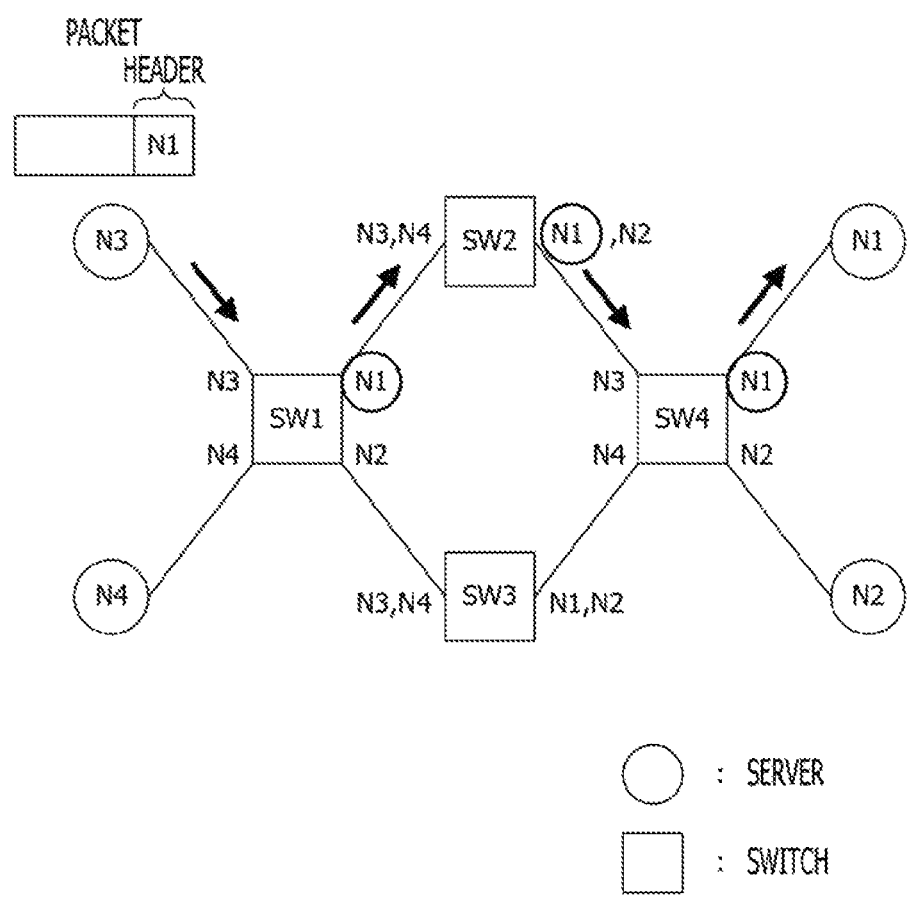
FIG. 10 is a view illustrating routing in an Infiniband network.

In the Latin square fat-tree system 1000 of the present embodiment, in order to avoid route competition, a network of the InfiniBand in which regular and fixed routing is performed is utilized. Routing in a network of the InfiniBand is described with reference to FIG. 10. In FIG. 10, a round mark represents a server and a square mark represents a switch. A line segment represents a link of the InfiniBand and a character string indicated near the line segment represents identification information of a server of the destination. An arrow mark of a thick solid line represents a communication route.

In the example of FIG. 10, a server N3 transmits a packet whose destination is a server N1. Identification information (for example, a local identifier (LID)) of the destination is included in the header of the packet. Since identification information of a server of a destination is associated with each output port of each switch, each switch outputs a packet to the output port corresponding to the identification information of a destination included in the packet. In the example of FIG. 10, the packet reaches the server N1 through a switch SW1, another switch SW2 and a further switch SW4.

In this manner, the network of the present embodiment is not a network in which a route is determined automatically as in the Ethernet (registered trademark) but a network in which regular and fixed routing is performed.

Note that it is assumed that a number is allocated to each server separately from the identification information described above. For example, one of numbers of 0 to 3 is allocated to each of four servers coupled to each Leaf switch, and a server to which "0" is allocated, another server to which "1" is allocated, a further server to which "2" is allocated and a still further server to which "3" is allocated are coupled to each Leaf switch.

In the following description, Leaf switch P is referred to as representative switch. The server to which "0" is allocated from among the four servers coupled to the Leaf switch other than the representative switch is referred to as representative server.

Figure 11:
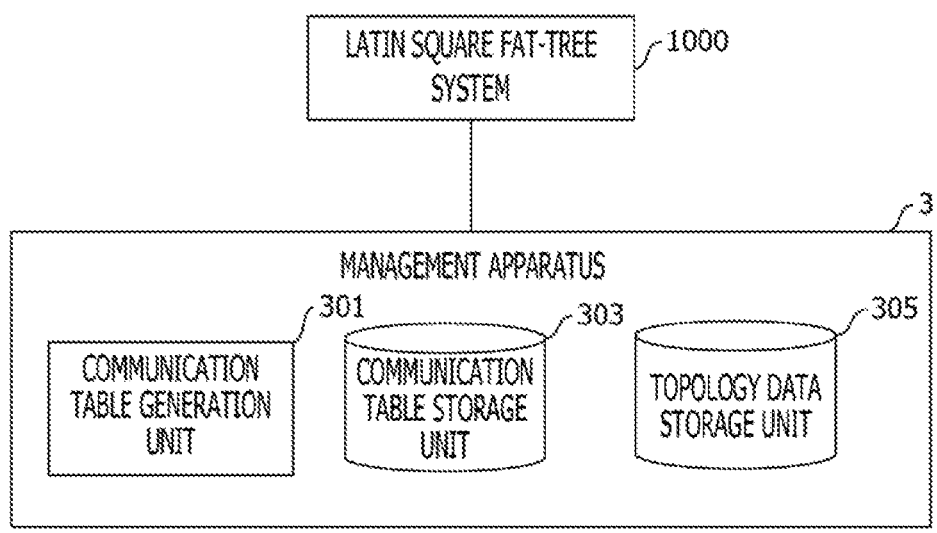
FIG. 11 is a functional block diagram of a management apparatus.

FIG. 11 is a functional block diagram of a management apparatus. As depicted in FIG. 11, the Latin square fat-tree system 1000 is coupled to a management apparatus 3 through a management local area network (LAN) or the like such that communication in the Latin square fat-tree system 1000 is managed by the management apparatus 3. The management apparatus 3 includes a communication table generation unit 301, a communication table storage unit 303 and a topology data storage unit 305.

The communication table generation unit 301 generates first to fifth communication tables based on information of a network topology of the Latin square fat-tree system 1000 stored in the topology data storage unit 305, and stores the generated first to fifth communication tables into the communication table storage unit 303. The communication table generation unit 301 transmits the first to fifth communication tables stored in the communication table storage unit 303 to the servers in the Latin square fat-tree system 1000 at a given timing or in response to a request.

Figure 12:
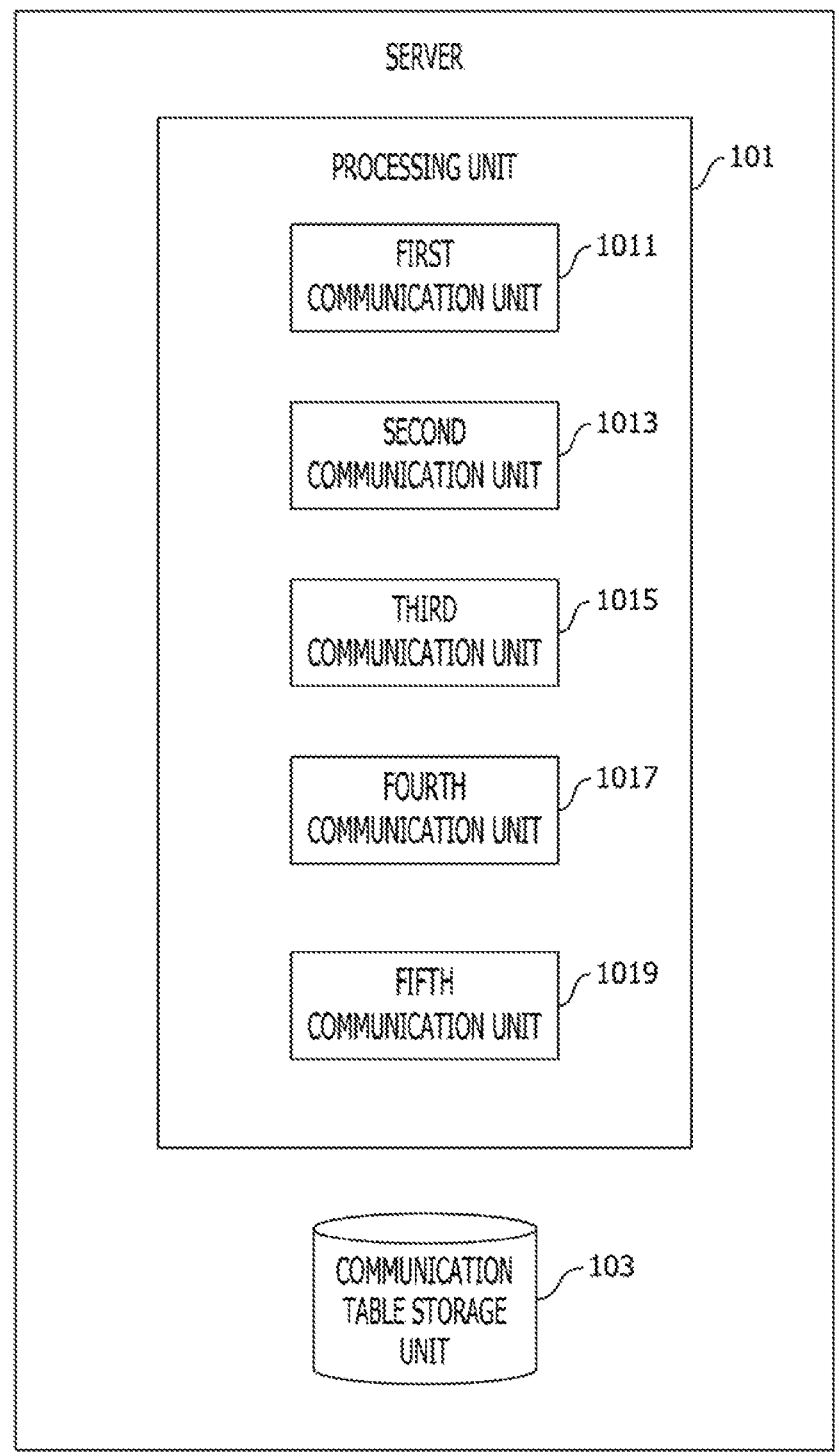
FIG. 12 is a functional block diagram of a server.

FIG. 12 is a functional block diagram of a server. The server includes a processing unit 101 and a communication table storage unit 103. The processing unit 101 includes a first communication unit 1011, a second communication unit 1013, a third communication unit 1015, a fourth communication unit 1017 and a fifth communication unit 1019.

The first to fifth communication tables received from the management apparatus 3 are stored in the communication table storage unit 103. The first communication unit 1011 performs communication in accordance with the first communication table stored in the communication table storage unit 103. The second communication unit 1013 performs communication in accordance with the second communication table stored in the communication table storage unit 103. The third communication unit 1015 performs communication in accordance with the third communication table stored in the communication table storage unit 103. The fourth communication unit 1017 performs communication in accordance with the fourth communication table stored in the communication table storage unit 103. The fifth communication unit 1019 performs communication in accordance with the fifth communication table stored in the communication table storage unit 103.

Now, a process executed by a management apparatus is described with reference to FIGS. 13 to 42.

Figure 13:
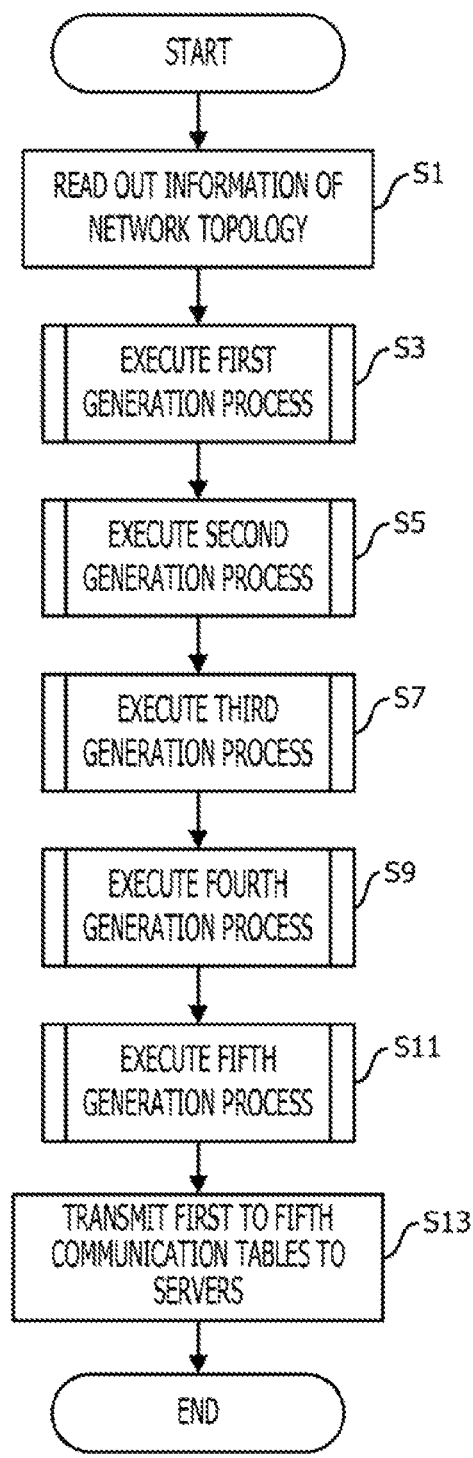
FIG. 13 is a view illustrating a processing flow of a process executed by a management apparatus.

FIG. 13 is a view illustrating a processing flow of a process executed by a management apparatus. The management apparatus here may be the management apparatus 3 in FIG. 11. The communication table generation unit 301 in the management apparatus 3 reads out information of the network topology of the Latin square fat-tree system 1000 from the topology data storage unit 305 (FIG. 13: step S1). The information of the network topology includes, for example, information of a coupling relation of the Spine switches, Leaf switches and servers.

The communication table generation unit 301 executes a first generation process that is a process for generating a first communication table based on the information of the network topology read out at step S1 (step S3). The first generation process is hereinafter described.

The communication table generation unit 301 executes a second generation process that is a process for generating a second communication table based on the information of the network topology read out at step S1 (step S5). The second generation process is hereinafter described.

The communication table generation unit 301 executes a third generation process that is a process for generating a third communication table based on the information of the network topology read out at step S1 (step S7). The third generation process is hereinafter described.

The communication table generation unit 301 executes a fourth generation process that is a process for generating a fourth communication table based on the information of the network topology read out at step S1 (step S9). The fourth generation process is hereinafter described.

The communication table generation unit 301 executes a fifth generation process that is a process for generating a fifth communication table based on the information of the network topology read out at step S1 (step S11). The fifth generation process is hereinafter described.

Then, the communication table generation unit 301 reads out the first to fifth communication tables stored in the communication table storage unit 303 and transmits the read out first to fifth communication tables to the corresponding servers of the Latin square fat-tree system 1000 (step S13). Then, the processing ends.

If such processes as described above are executed, the servers may execute communication in a suitable procedure in accordance with the first to fifth communication tables.

Figure 14:
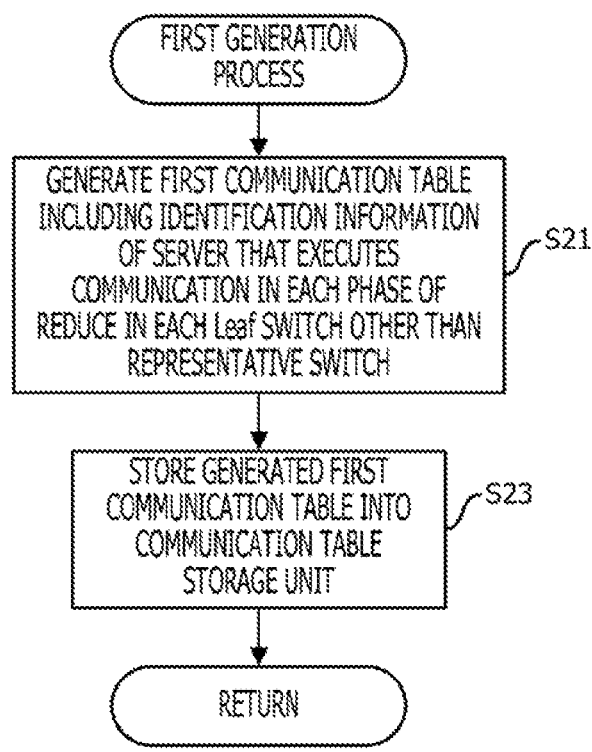
FIG. 14 is a view illustrating a processing flow of a first generation process.

The first generation process is described with reference to FIGS. 14 to 18. FIG. 14 is a view depicting a processing flow of the first generation process.

The communication table generation unit 301 generates a first communication table including identification information of the server that executes communication in each phase of a reduce in the Leaf switches other than the representative switch (step S21: FIG. 14).

It is to be noted that reduce communication signifies communication for allowing one of nodes of a target (e.g., a server) to have a result of arithmetic operation executed using data all the nodes of the target have, and reduce signifies the arithmetic operation. In the reduce implemented based on the first communication table, communication is performed such that the representative server of the Leaf switches other than the representative switch has a result.

Figure 15:
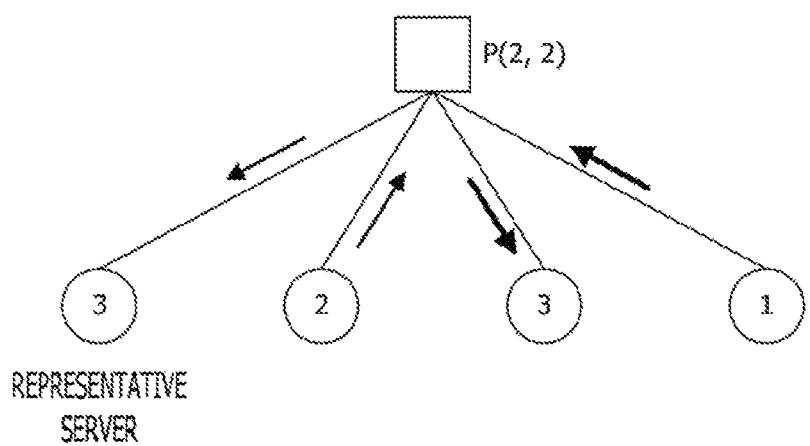
FIGS. 15 to 17 are views illustrating reduces implemented based on a first communication table.
Figure 16:
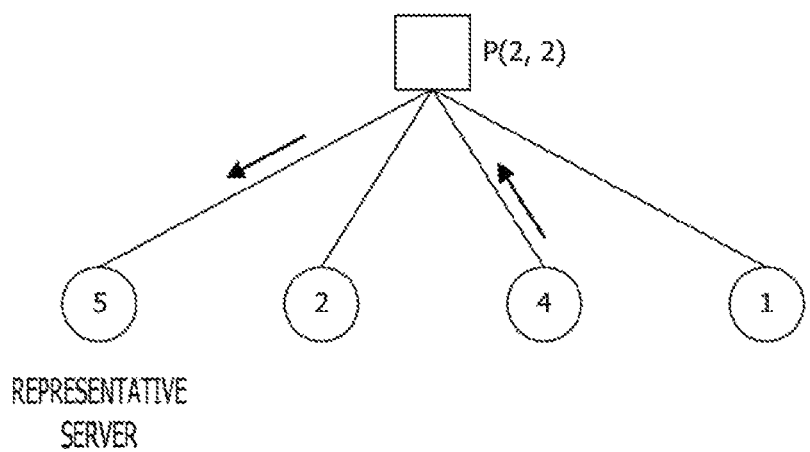
Figure 17:
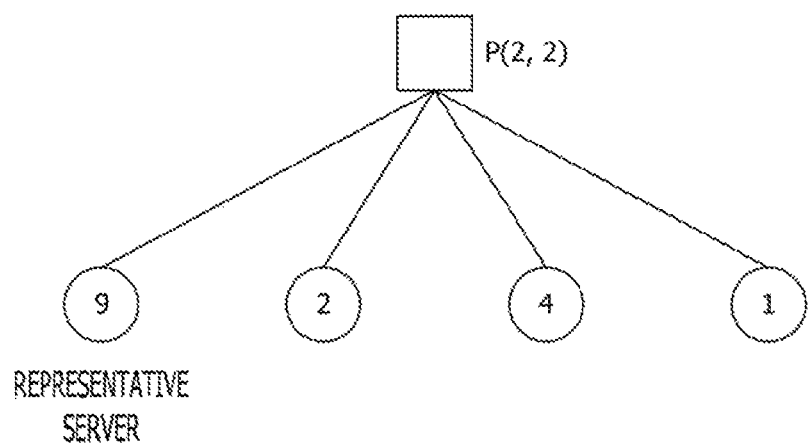

The reduce implemented based on the first communication table is described with reference to FIGS. 15 to 17. In FIGS. 15 to 17, as an example, the Leaf switch P(2, 2) and four servers coupled to the Leaf switch P(2, 2) are depicted, and the server positioned leftmost is the representative server. Here, identification information of the representative server is n221; identification information of the server having a value "2" is n222; identification information of the server that has a value "3" and is not representative server is n223; and identification information of the server having a value "1" is n224. First, as depicted in FIG. 15, the server n222 transmits the value "2" to the representative server (for example, server n221) and the server n224 transmits the value "1" to the server n223 in parallel. The representative server and server n223 execute arithmetic operation (here, addition).

Then, the representative server has a value "5" and the server n223 has a value "4" as depicted in FIG. 16. Then, the server n223 transmits the value "4" to the representative server. The representative server executes arithmetic operation.

Then, as depicted in FIG. 17, the representative server has a value "9" corresponding to the total of the four original numbers. The reduce is implemented in such a manner as described above. Since the number of phases is 2 and the number d of servers is 4, the reduce is implemented in the O (log (d)) phases. The bottom of the logarithm is 2. Since a link in which a plurality of packets are transmitted at the same time in the same direction does not exist in any phase, route competition does not occur.

FIG. 18 is a view depicting an example of the first communication table. In FIG. 18, communication information of communication executed among servers coupled to each Leaf switch is stored in the Leaf switch. For example, in a phase 1, transmission from the server n222 to the server n221 and transmission from the server n224 to server n223 are performed in parallel in the Leaf switch P(2, 2). Further, transmission from the server n212 to server n211 and transmission from the server n214 to the server n213 are performed in parallel in the Leaf switch P(2, 1).

Referring back to FIG. 14, the communication table generation unit 301 stores the first communication table generated at step S21 into the communication table storage unit 303 (step S23). Then, the processing returns to the process illustrated in FIG. 13.

Figure 19:
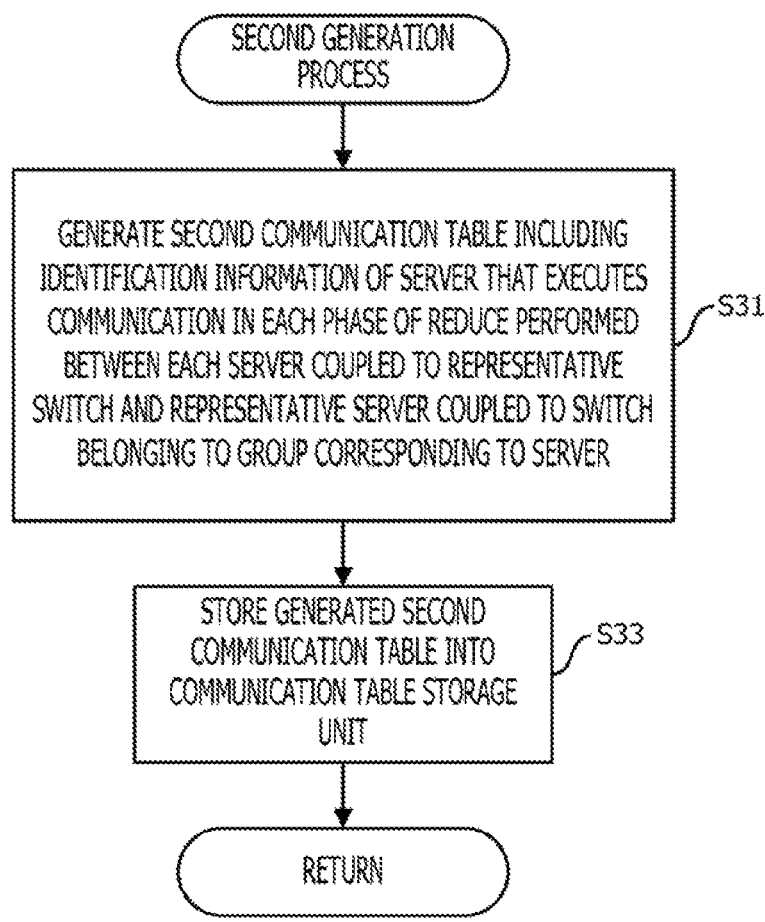
FIG. 19 is a view depicting a processing flow of a second generation process.

Now, the second generation process is described with reference to FIGS. 19 to 23. FIG. 19 is a view depicting a processing flow of the second generation process.

The communication table generation unit 301 generates a second communication table including identification information of a server that executes communication in each phase of a reduce to be performed between each server coupled to the representative switch and the representative server coupled to a switch belonging to a group corresponding to the server (FIG. 19: step S31). In Allreduce implemented based on the second communication table, communication is performed such that the servers coupled to the representative switch have a result of the reduce.

It is to be noted that each Leaf switch other than the representative switch belongs to a same group as that of other Leaf switches disposed on a same linear line in FIG. 8 (for example, coupled to a same Spine switch), and each group corresponds to one of servers coupled to the representative switch. Numbers (from 0 to 3 (=d–1)) are allocated in advance to the linear lines in FIG. 8, and a number different from that of any other linear line is allocated to each linear line. Accordingly, a server having a same number from among servers coupled to a representative switch may be associated with each linear line (for example, each group).

Figure 20:
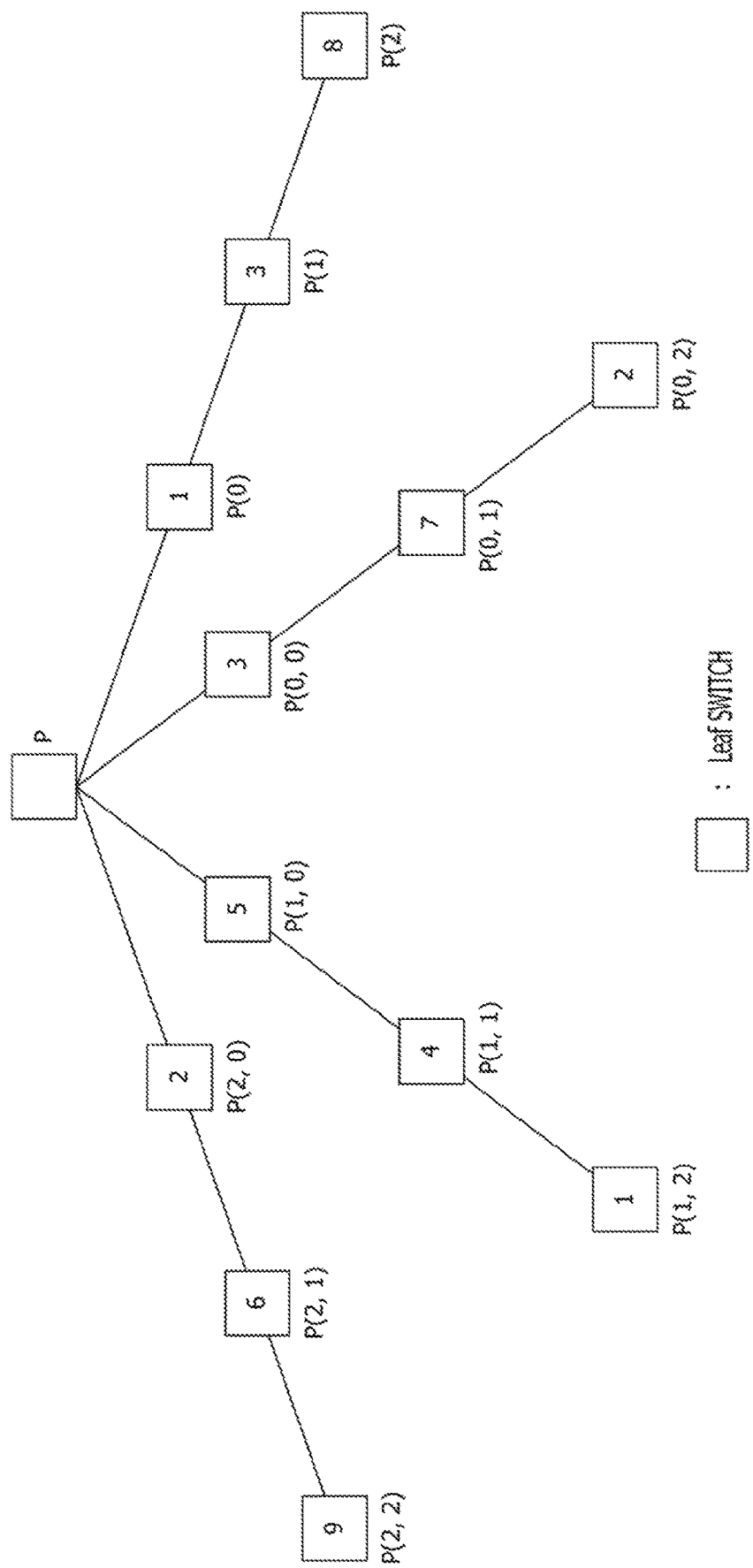
FIGS. 20 to 22 are views illustrating reduces implemented based on a second communication table.

Reduce implemented based on the second communication table is described with reference to FIGS. 20 to 22. FIG. 20 is a view depicting a value the representative server coupled to the Leaf switches other than the representative switch has. In FIG. 20, the number in each Leaf switch other than the representative switch represents a value the representative server coupled to the Leaf switch has.

Figure 21:
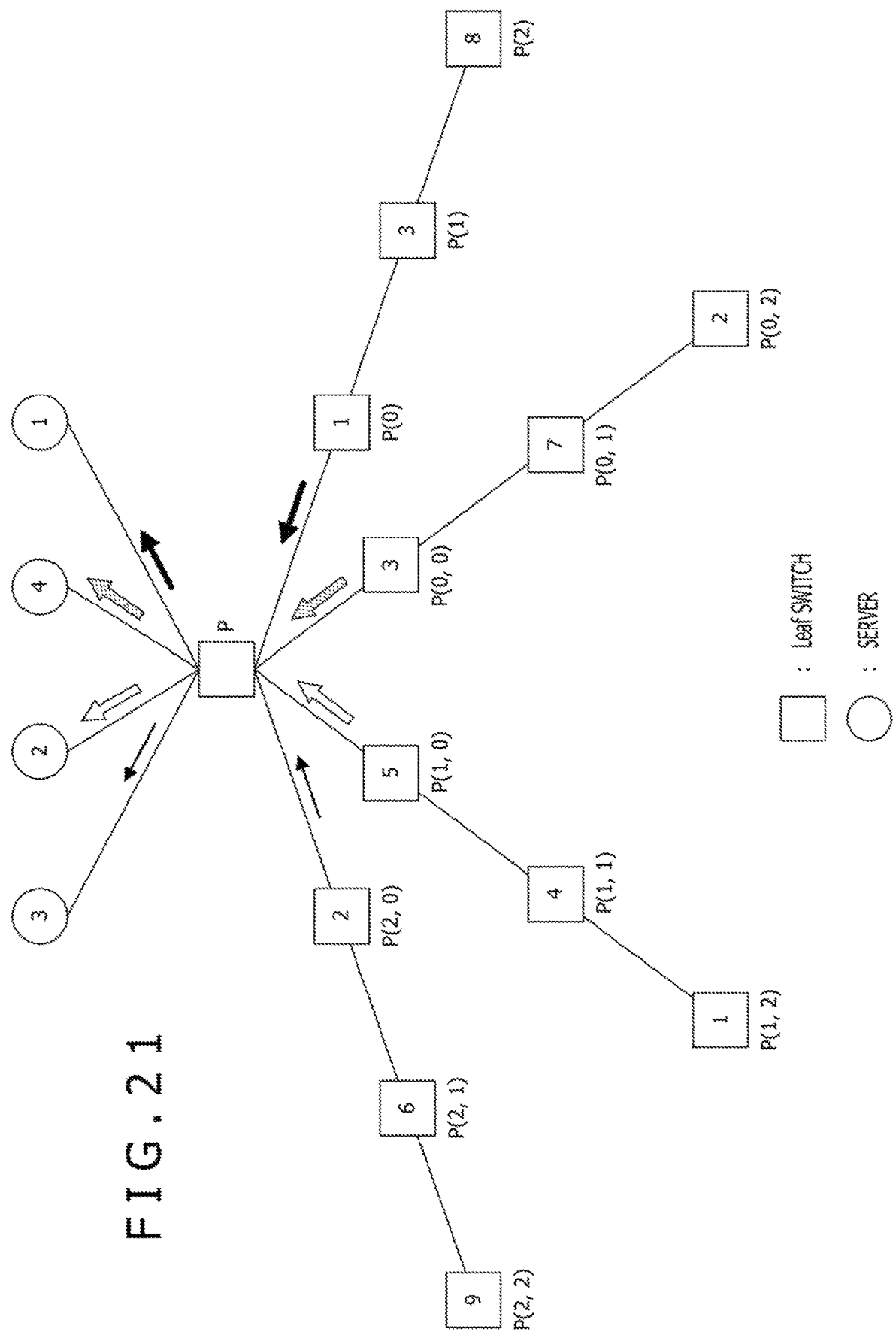

FIG. 21 is a view depicting a flow of data in the reduce implemented based on the second communication table. In FIG. 21, a group to which a Leaf switch P(0), another Leaf switch P(1) and a further Leaf switch P(2) belong is associated with a server having a value "1" from among the servers coupled to the representative switch. A group to which a Leaf switch P(0, 0), another Leaf switch P(0, 1) and a further Leaf switch P(0, 2) belong is associated with a server having a value "4" from among the servers coupled to the representative switch. A group to which a Leaf switch P(1, 0), another Leaf switch P(1, 1) and a further Leaf switch P(1, 2) belong is associated with a server having a value "2" from among the servers coupled to the representative switch. A group to which a Leaf switch P(2, 0), another Leaf switch P(2, 1) and a further Leaf switch P(2, 2) belong is associated with a server having a value "3" from among the servers coupled to the representative switch.

In the case of the example of FIG. 21, the number of phases is 2. For example, attention is paid to the group to which the Leaf switch P(0), Leaf switch P(1) and Leaf switch P(2) belong. In the phase 1, transmission from the representative server coupled to the Leaf switch P(0) to the server having the value "1" and transmission from the representative server coupled to the Leaf switch P(2) to the representative server coupled to the Leaf switch P(1) are performed in parallel. In the phase 2, transmission from the representative server coupled to the Leaf switch P(1) to the server having the value "2" (=1+1) is performed. Consequently, the reduce is implemented. Reduce is implemented similarly also for the different groups. Since the number of the phases is 2 and the number d of the servers is 4, the reduce is implemented in the O (log (d)) phases. Since, in any phase, no link exists in which a plurality of packets are transmitted at the same time in the same direction, route competition does not occur.

Figure 22:
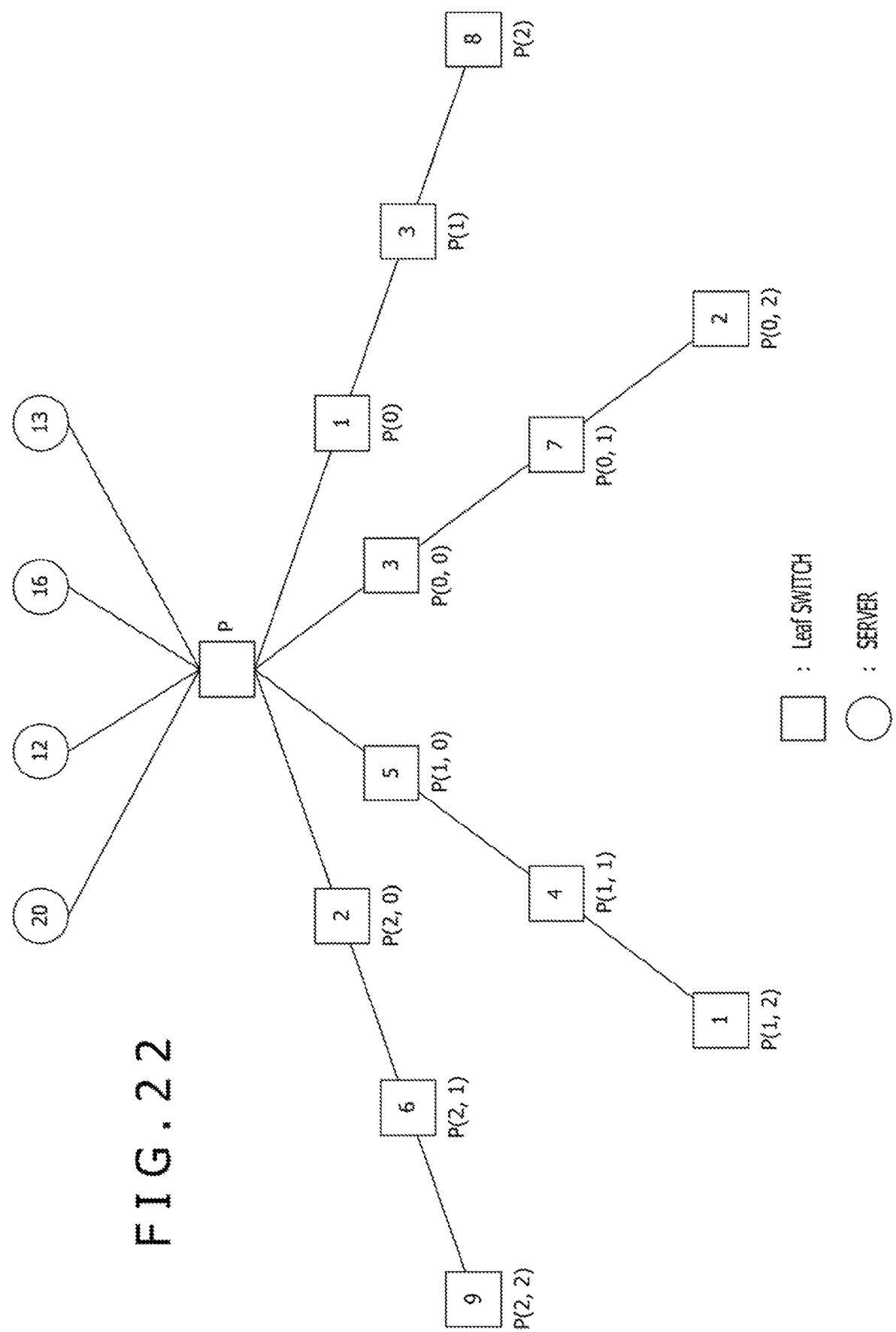

FIG. 22 is a view depicting a result of the reduce executed in accordance with the second communication table. In FIG. 22, from among the servers coupled to the representative switch, a server corresponding to the group to which the Leaf switch P(0), Leaf switch P(1) and Leaf switch P(2) belong has a value "13" (=1+1+3+8). From among the servers coupled to the representative switch, a server corresponding to the group to which the Leaf switch P(0, 0), Leaf switch P(0, 1) and Leaf switch P(0, 2) belong has a value "16" (=4+3+7+2). From among the servers coupled to the representative switch, a server corresponding to the group to which the Leaf switch P(1, 0), Leaf switch P(1, 1) and Leaf switch P(1, 2) belong has a value "12" (=2+5+4+1). From among the servers coupled to the representative switch, a server corresponding to the group to which the Leaf switch P(2, 0), Leaf switch P(2, 1) and Leaf switch P(2, 2) belong has a value "20" (=3+2+6+9).

FIG. 23 is a view depicting an example of the second communication table. In FIG. 23, communication information of the communication executed by the representative server is stored for each group. For example, in the phase 1, in regard to the group to which the Leaf switches coupled to the Spine switch L(2) belong, transmission from the server n201 to the server n4 and transmission from the server n221 to the server n211 are performed in parallel. Further, in regard to the group to which the Leaf switches coupled to the Spine switch L(1) belong, transmission from the server n101 to the server n3 and transmission from the server n121 to the server n111 are performed in parallel.

Referring back to FIG. 19, the communication table generation unit 301 stores the second communication table generated at step S31 into the communication table storage unit 303 (step S33). Then, the processing returns to the process illustrated in FIG. 13.

Figure 24:
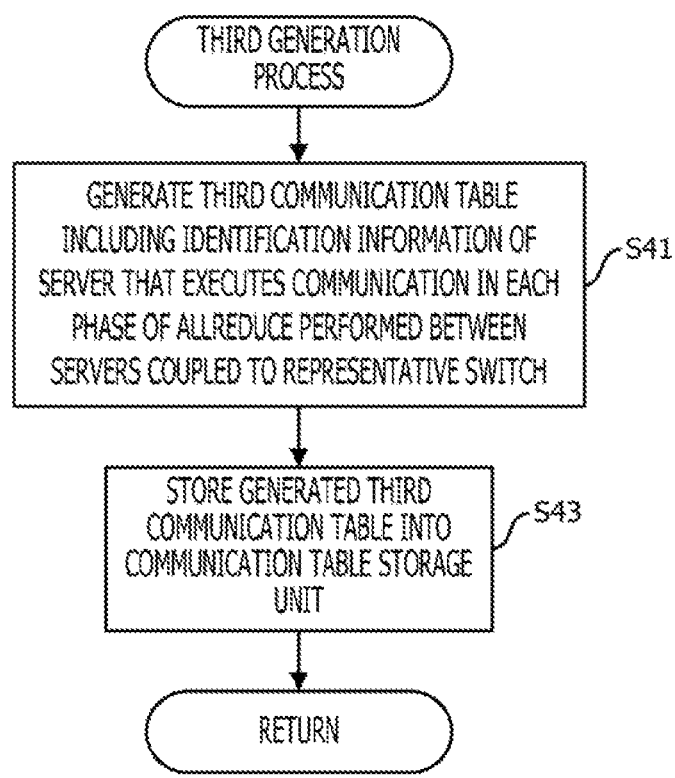
FIG. 24 is a view depicting a processing flow of a third generation process.
Figure 25:
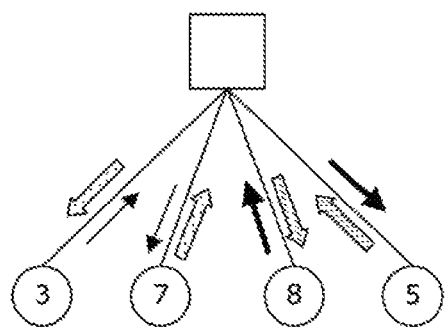
Figure 25:
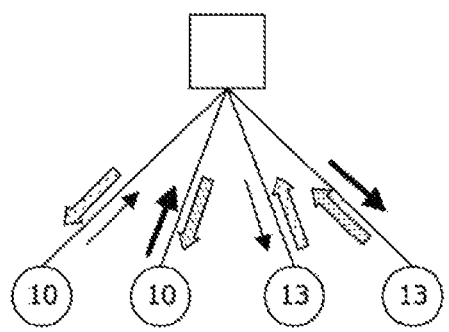

Now, the third generation process is described with reference to FIGS. 24 to 33. FIG. 24 is a view depicting a processing flow of the third generation process.

The communication table generation unit 301 generates a third communication table including identification information of servers that are coupled to the representative switch and execute communication in each phase of Allreduce performed between the servers (FIG. 24: step S41).

FIGS. 25A to 29 are views illustrating Allreduce among servers coupled to a Leaf switch. In FIGS. 25A to 29, a square mark represents a Leaf switch; a round mark represents a server; and a line segment coupling a Leaf switch and a server to each other represents a link. A number added to each server represents a value the server has.

First, a case in which the number of servers coupled to a Leaf switch is an even number (here, 4 that is an exponent of 2) is described with reference to FIGS. 25A, 25B and 26.

For example, it is assumed that the four servers have "3," "7," "8" and "5" as depicted in FIG. 25A. In this case, values are shared by each pair including two servers and arithmetic operation of the values (here, addition) is performed. Here, since a plurality of packets are not transmitted at the same time in the same direction of one route, route competition does not occur.

Then, as depicted in FIG. 25B, two servers have a value "10" and the remaining two servers have a value "13." Then, values are shared by a pair including the servers having the value "10" and another pair including the server having the value "13" and arithmetic operation of the values (here, addition) is performed. Here, since a plurality of packets are not transmitted at the same time in the same direction of one route, route competition does not occur.

Figure 26:
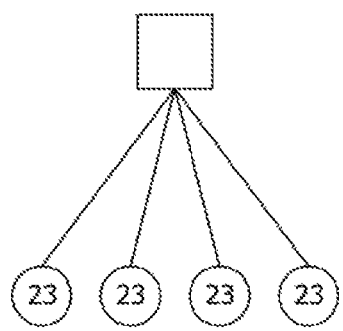
Figure 27:
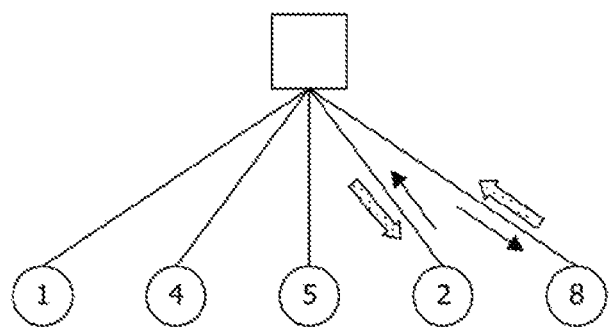
Figure 27:
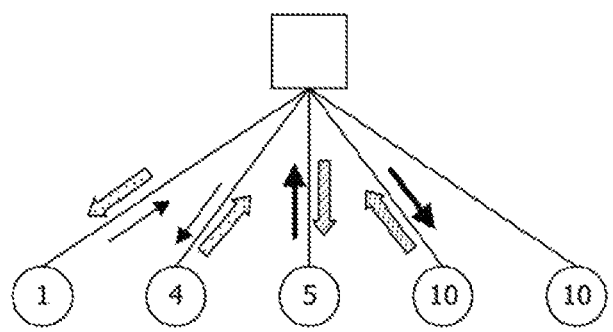
Figure 28:
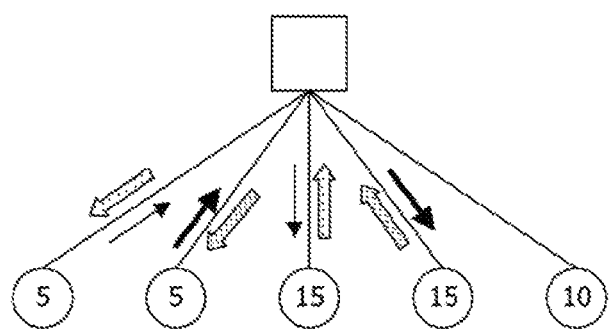
Figure 28:
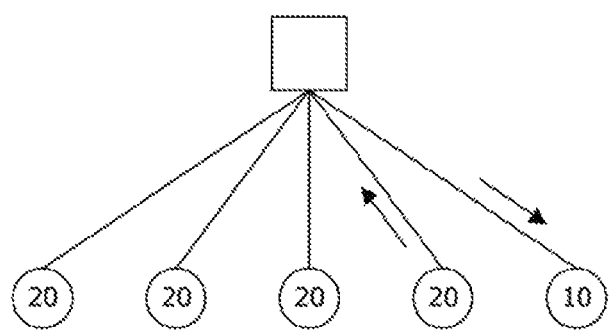

Consequently, the servers finally have a value "23" as depicted in FIG. 26.

Now, a case in which the number of servers coupled to a Leaf switch is an odd number (here, 5) is described with reference to FIGS. 27A to 29.

For example, it is assumed that the five servers have "1," "4," "5," "2" and "8" as depicted in FIG. 27A. In this case, values are shared by two servers from among the five servers and arithmetic operation of the values (here, addition) is performed. Here, since a plurality of packets are not transmitted at the same time in the same direction of one route, route competition does not occur.

Consequently, the five servers have "1," "4," "5," "10" and "10" as depicted in FIG. 27B. Then, values are shared by the server having the value "1" and the server having the value "4" and arithmetic operation of the values is performed. Further, values are shared by the server having the value "5" and the server having the value "10" and arithmetic operation of the value is performed. Here, since a plurality of packets are not transmitted at the same time in the same direction of one route, route competition does not occur.

Consequently, the five servers have "5," "5," "15," "15" and "10" as depicted in FIG. 28A. Then, values are shared by the server having the value "5" and the server having the value "15" and arithmetic operation of the values is performed, and values are shared by the server having the value "5" and the server having the value "15" and arithmetic operation of the values is performed. Here, since a plurality of packets are not transmitted at the same time in the same direction of one route, route competition does not occur.

Consequently, the five servers have "20," "20," "20," "20" and "10" as depicted in FIG. 28B. Then, a server having the value "20" issues a notification of the value "20" to the server having the value "10." Here, since a plurality of packets are not transmitted at the same time in the same direction of one route, route competition does not occur.

Figure 29:
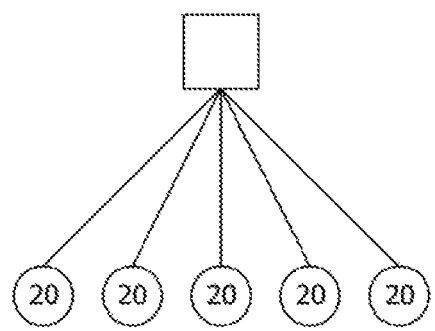

Consequently, the five servers finally have the value "20" as depicted in FIG. 29.

It is to be noted that, also in the case in which the number of servers is any other than the number in the example described, the Allreduce may be performed basically by a similar method.

Here, a process (hereinafter referred to as Allreduce (n)) in which a communication table is generated in the case where Allreduce is performed among n (n is a natural number) servers is described. In the present embodiment, a communication table is generated by a recursive process.

(1) In the case where the number n of servers coupled to the Leaf switch is 1, the processing ends.

(2) In the case where the number n of servers coupled to the Leaf switch is 2, communication information (particularly, information of a pair of servers) relating to communication between two servers is written into the communication table.

(3) In the case where the number n of servers coupled to the Leaf switch is an odd number 2m+1 (m is a natural number), two servers (server SP and server SQ) are selected from among the n servers and communication information regarding Allreduce communication between the server SP and the server SQ is written into a communication table. Then, Allreduce (2m) is called out regarding one of the server SP and the server SQ and the remaining (2m−1) servers (for example, regarding the 2m servers). Then, communication information for conveying a result of the Allreduce (2m) from the server SP to the server SQ is written into the communication table.

(4) In the case where the number of servers coupled to the Leaf switch is 2m (m is a natural number equal to or greater than 2), the servers are divided into a group of m servers and another group of m servers, and Allreduce (m) is called out for each group and processing proceeds simultaneously in parallel between the groups.

If such processing as described above is executed, a communication table in the case where Allreduce is performed between n servers is generated. As apparent from the description given with reference to FIGS. 25A to 29, if Allreduce communication is performed in accordance with the communication table generated by such a method as described above, route competition does not occur.

Figure 30:
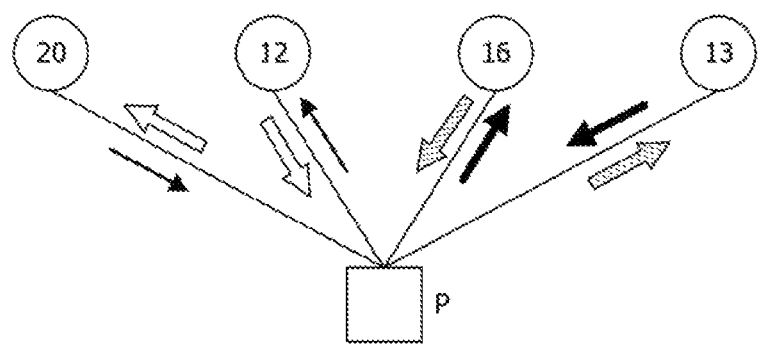
FIGS. 30 to 32 are views illustrating Allreduce between servers coupled to a representative switch.

Based on the foregoing description, Allreduce between servers coupled to a representative switch is described with reference to FIGS. 30 to 32. FIG. 30 depicts a Leaf switch P that is a representative switch and four servers coupled to the representative switch. As depicted in FIG. 30, in the phase 1, values are shared between a server having the value "20" and another server having the value "12" and arithmetic operation of the values is performed, and values are shared between a server having the value "16" and another server having the value "13" and arithmetic operation of the values is performed.

Figure 31:
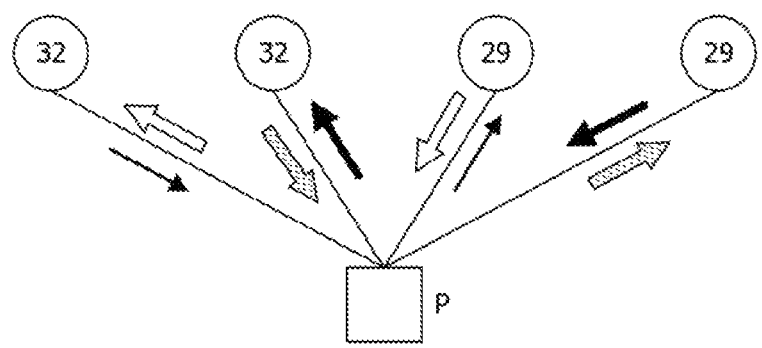

As depicted in FIG. 31, in the phase 2, values are shared between a server having the value "32" and another server having the value "29" and arithmetic operation of the values is performed, and values are shared between a different server having the value "32" and another different server having the value "29" and arithmetic operation of the values is performed.

Figure 32:
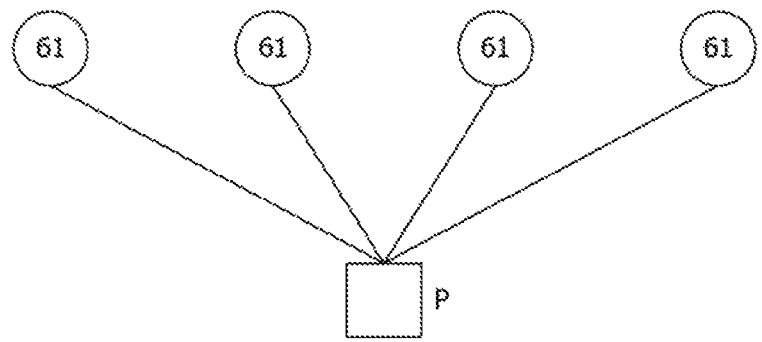

By the processes described above, the servers finally have the value "61" as depicted in FIG. 32. Since the number of phases is 2 and the number d of servers is 4, Allreduce is implemented in O (log (d)) phases.

FIG. 33 is a view illustrating an example of the third communication table. In FIG. 33, communication information of communication performed between servers coupled to a representative switch is stored. Identification information in parentheses represents identification information of a pair server that executes communication. For example, in the phase 1, values are shared between the server n1 and the server n2 and arithmetic operation of the values is performed, and values are shared between the server n3 and the server n4 and arithmetic operation of the values is performed. On the other hand, in the phase 2, values are shared between the server n1 and the server n3 and arithmetic operation of the values is performed, and values are shared between the server n2 and the server n4 and arithmetic operation of the values is performed.

Referring back to FIG. 24, the communication table generation unit 301 stores the third communication table generated at step S41 into the communication table storage unit 303 (step S43). Then, the processing returns to the process illustrated in FIG. 13.

Figure 34:
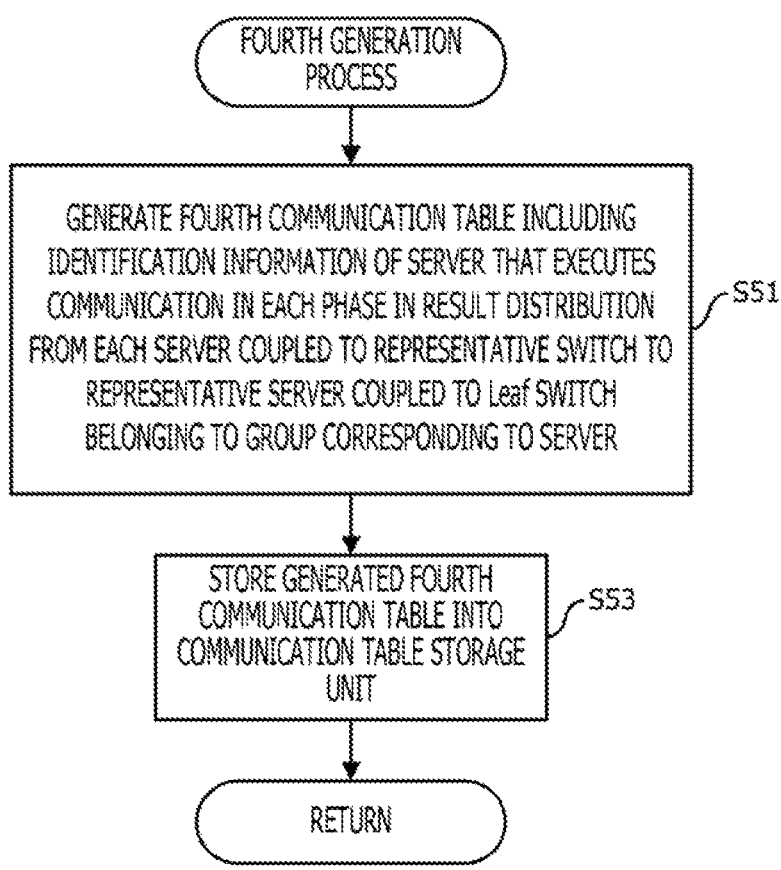
FIG. 34 is a view depicting a processing flow of a fourth generation process.

Now, the fourth generation process is described with reference to FIGS. 34 to 37. FIG. 34 is a view illustrating a processing flow of the fourth generation process.

The communication table generation unit 301 generates a fourth communication table including identification information of servers that execute communication in each phase in result distribution from each server coupled to a representative switch to a representative server coupled to a Leaf switch belonging to a group corresponding to the server (FIG. 34: step S51). The result distribution is a process for distributing a result of Allreduce each server coupled to the representative switch has to a different server that does not have the result.

Figure 35:
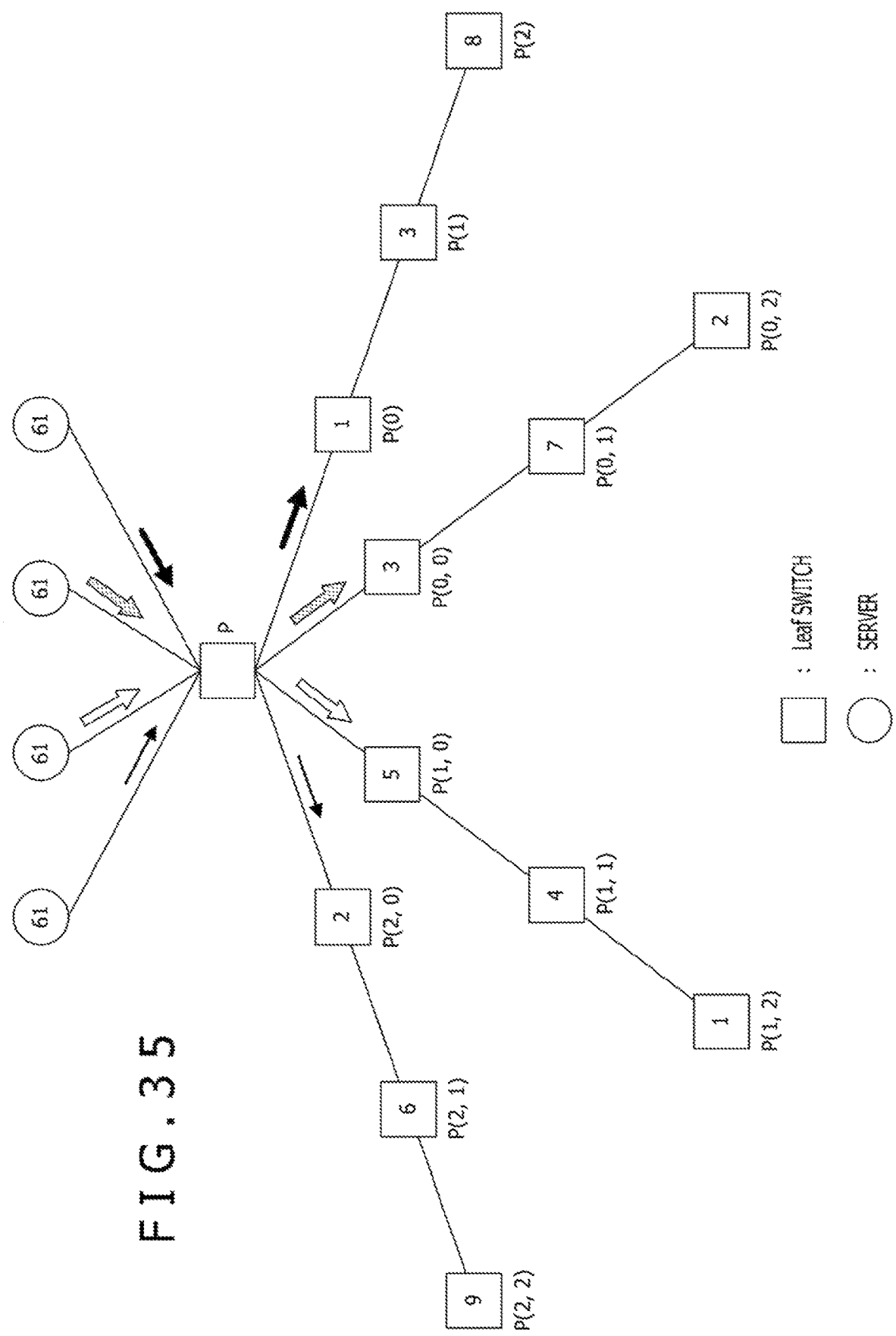
FIGS. 35 and 36 are views illustrating result distributions implemented based on a fourth communication table.

The result distribution implemented based on the fourth communication table is described with reference to FIGS. 35 and 36. FIG. 35 is a view illustrating a flow of data in the result distribution implemented based on the fourth communication table. In FIG. 35, the first server from the right from among servers coupled to a representative switch is associated with a group to which a Leaf switch P(0), another Leaf switch P(1) and a further Leaf switch P(2) belong. The second server from the right from among the servers coupled to the representative switch is associated with a group to which a Leaf switch P(0, 0), another Leaf switch P(0, 1) and a further Leaf switch P(0, 2) belong. The third server from the right from among the servers coupled to the representative switch is associated with a group to which a Leaf switch P(1, 0), another Leaf switch P(1, 1) and a further Leaf switch P(1, 2) belong. The fourth server from the right from among the servers coupled to the representative switch is associated with a group to which a Leaf switch P(2, 0), another Leaf switch P(2, 1) and a further Leaf switch P(2, 2) belong.

In the case of the example of FIG. 35, the number of phases is 2. For example, attention is paid to the first server from the right from among the servers coupled to the representative switch. In the phase 1, the first server from the right from among the servers coupled to the representative switch transmits a value "61" to the representative server coupled to the Leaf switch P(1). In the phase 2, the first server from the right from among the servers coupled to the representative switch transmits the value "61" to the representative server coupled to the Leaf switch P(0), and the representative server coupled to the Leaf switch P(1) transmits the value "61" to the representative server coupled to the Leaf switch P(2).

Figure 36:
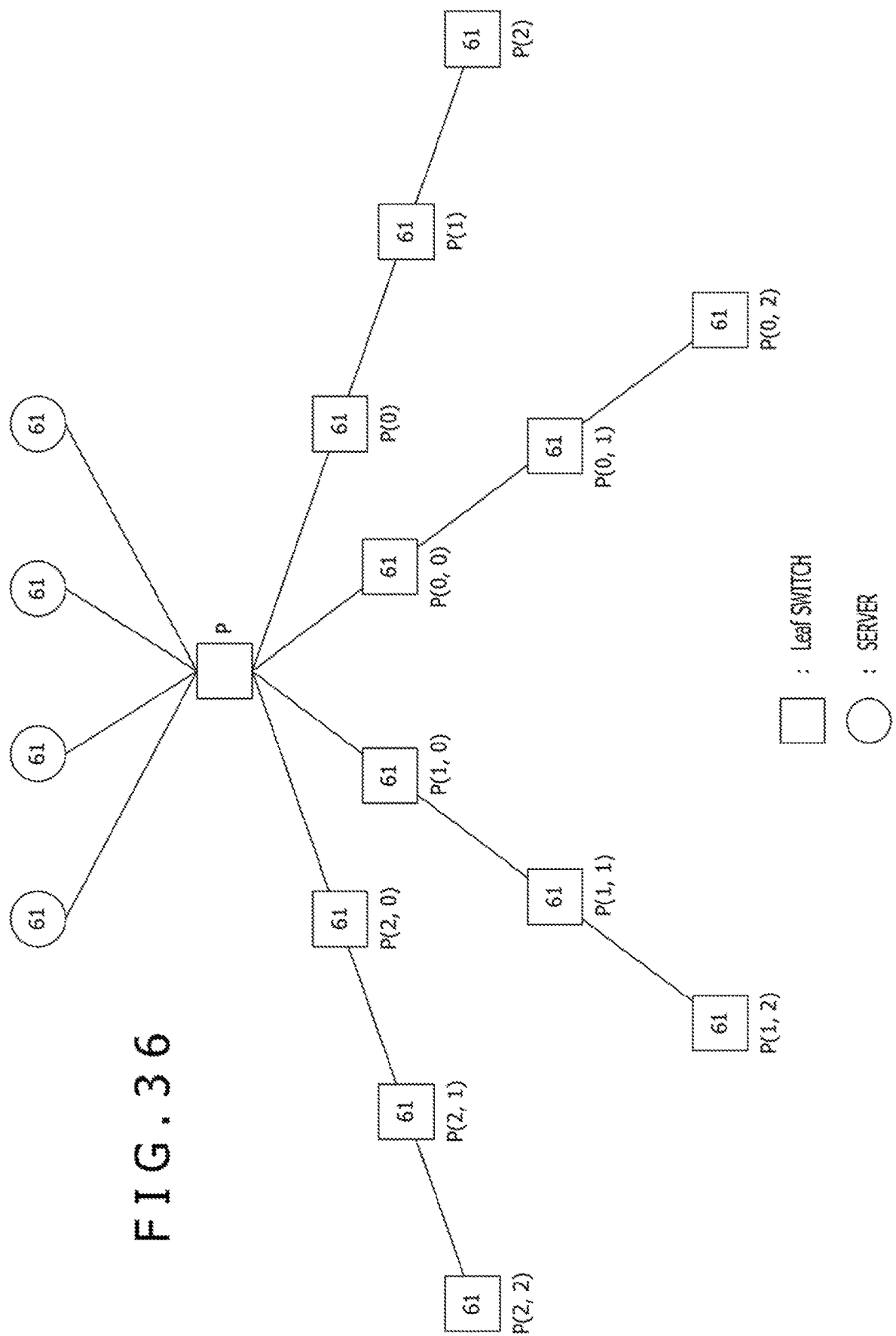

FIG. 36 is a view indicative of a result of the result distribution executed in accordance with the fourth communication table. In FIG. 36, the value in each Leaf switch indicates a value the representative server coupled to the Leaf switch has. Accordingly, the representative servers in the Latin square fat-tree system 1000 have a result of the Allreduce. However, at this point of time, servers other than the representative server from among the servers coupled to the Leaf switches other than the representative switch do not have the result of the Allreduce.

FIG. 37 is a view depicting an example of the fourth communication table. In FIG. 37, communication information of communication executed by servers coupled to a representative switch are stored for each group. For example, in the phase 1, the server n4 transmits a value to the server n211 that is a representative server of the group to which the Leaf switch coupled to the Spine switch L(2) belongs. Meanwhile, the server n3 transmits a value to the server n111 that is a representative server of the group to which the Leaf switch coupled to the Spine switch L(1) belongs.

The result distribution based on the fourth communication table is implemented in such a manner as described above. Since the number of phases is 2 and the number d of servers is 4, result distribution based on the fourth communication table is implemented in O (log (d)) phases. Since links along which a plurality of packets are transmitted at the same time in the same direction do not exist in any phase, route competition does not occur.

Referring back to FIG. 34, the communication table generation unit 301 stores the fourth communication table generated at step S51 into the communication table storage unit 303 (step S53). Then the processing returns to the process illustrated in FIG. 13.

Figure 38:
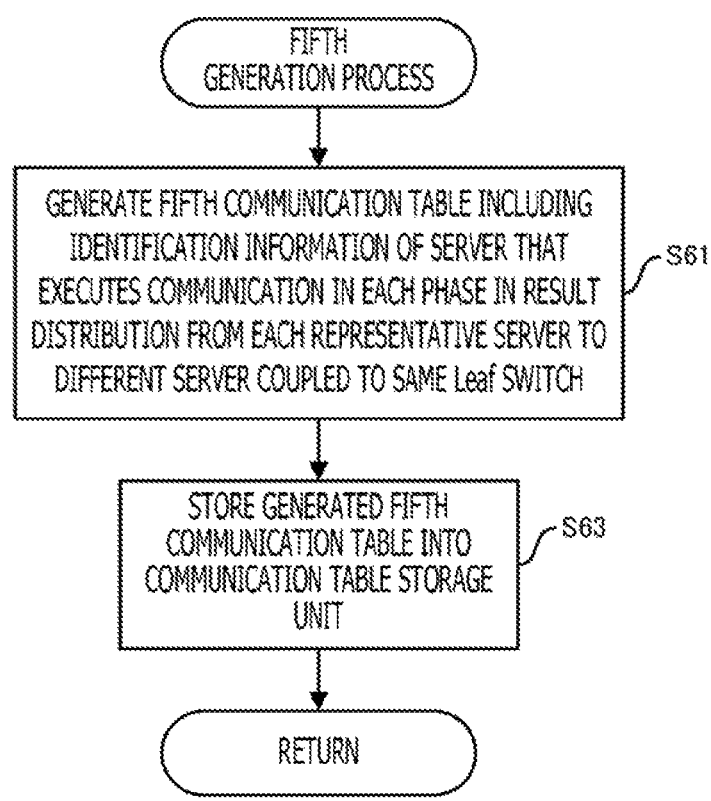
FIG. 38 is a view depicting a processing flow of a fifth generation process.

Now, the fifth generation process is described with reference to FIGS. 38 to 42. FIG. 38 is a view depicting a processing flow of the fifth generation process.

The communication table generation unit 301 generates a fifth communication table including identification information of servers that execute communication in phases in result distribution from each representative server to other servers coupled to a Leaf switch same as that to which the representative server is coupled (FIG. 38: step S61).

Figure 39:
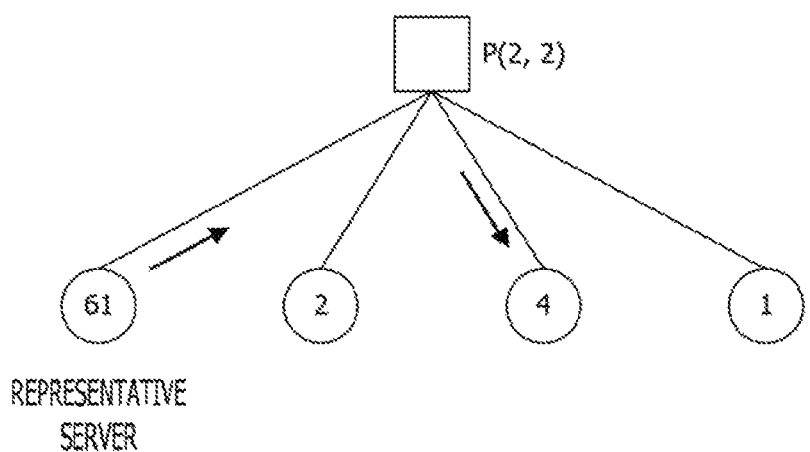
FIGS. 39 to 41 are views illustrating result distribution implemented based on a fifth communication table.
Figure 40:
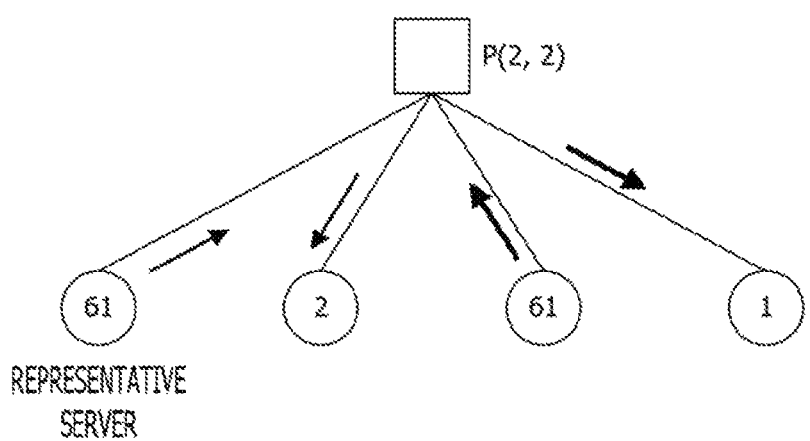
Figure 41:
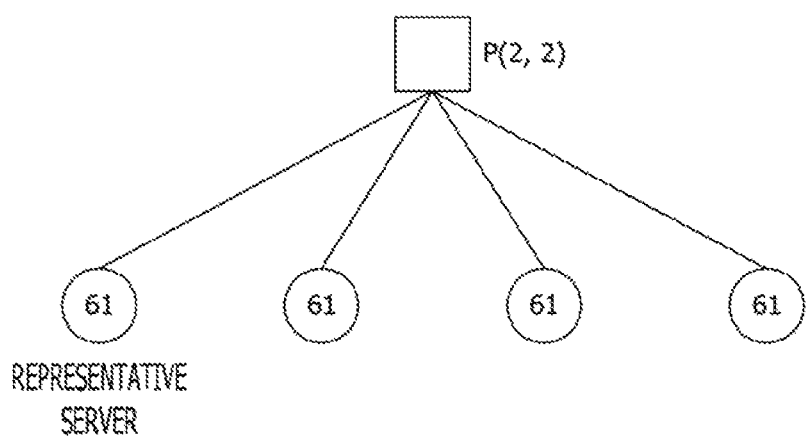

The result distribution implemented based on the fifth communication table is described with reference to FIGS. 39 to 41. In FIGS. 39 to 41, as an example, a Leaf switch P(2, 2) and four servers coupled to the Leaf switch P(2, 2) are depicted, and the server positioned leftmost is a representative server. Here, it is assumed that the identification information of the representative server is n221; the identification information of the server having the value "2" is n222; the identification information of the server having the value "4" is n223; and the identification information of the server having the value "1" is n224. First, the representative server transmits the value "61" to the server n223 as depicted in FIG. 39.

Consequently, as depicted in FIG. 40, the representative server and the server n223 have the value "61"; the server n222 has the value "2"; and the server n224 has the value "1." Then, the representative server transmits the value "61" to the server n222, and the server n223 transmits the value "61" to the server n224 as depicted in FIG. 40.

Consequently, the servers have the value "61" that is a result of the Allreduce as depicted in FIG. 41. The result distribution based on the fifth communication table is implemented in such a manner as described above. Since the number of phases is 2 and the number d of servers is 4, result distribution based on the fifth communication table is implemented in O (log (d)) phases. Since links along which a plurality of packets are transmitted at the same time in the same direction do not exist in any phase, route competition does not occur.

FIG. 42 is a view depicting an example of the fifth communication table. In FIG. 42, communication information of communication executed by servers coupled to a Leaf switch are stored for each Leaf switch. For example, in the phase 1, transmission from the server n221 to the server n223 is performed in the Leaf switch P(2, 2). On the other hand, in the phase 2, transmission from the server n221 to the server n222 and transmission from the server n223 to the server n224 are performed in parallel.

Referring back to FIG. 38, the communication table generation unit 301 stores the fifth communication table generated at step S61 into the communication table storage unit 303 (step S63). Then, the processing returns to the process illustrated in FIG. 13.

Now, a process executed by a server is described with reference to FIGS. 43 to 45. The present process is a process executed by each server that receives the first to fifth communication tables from the management apparatus 3.

Figure 43:
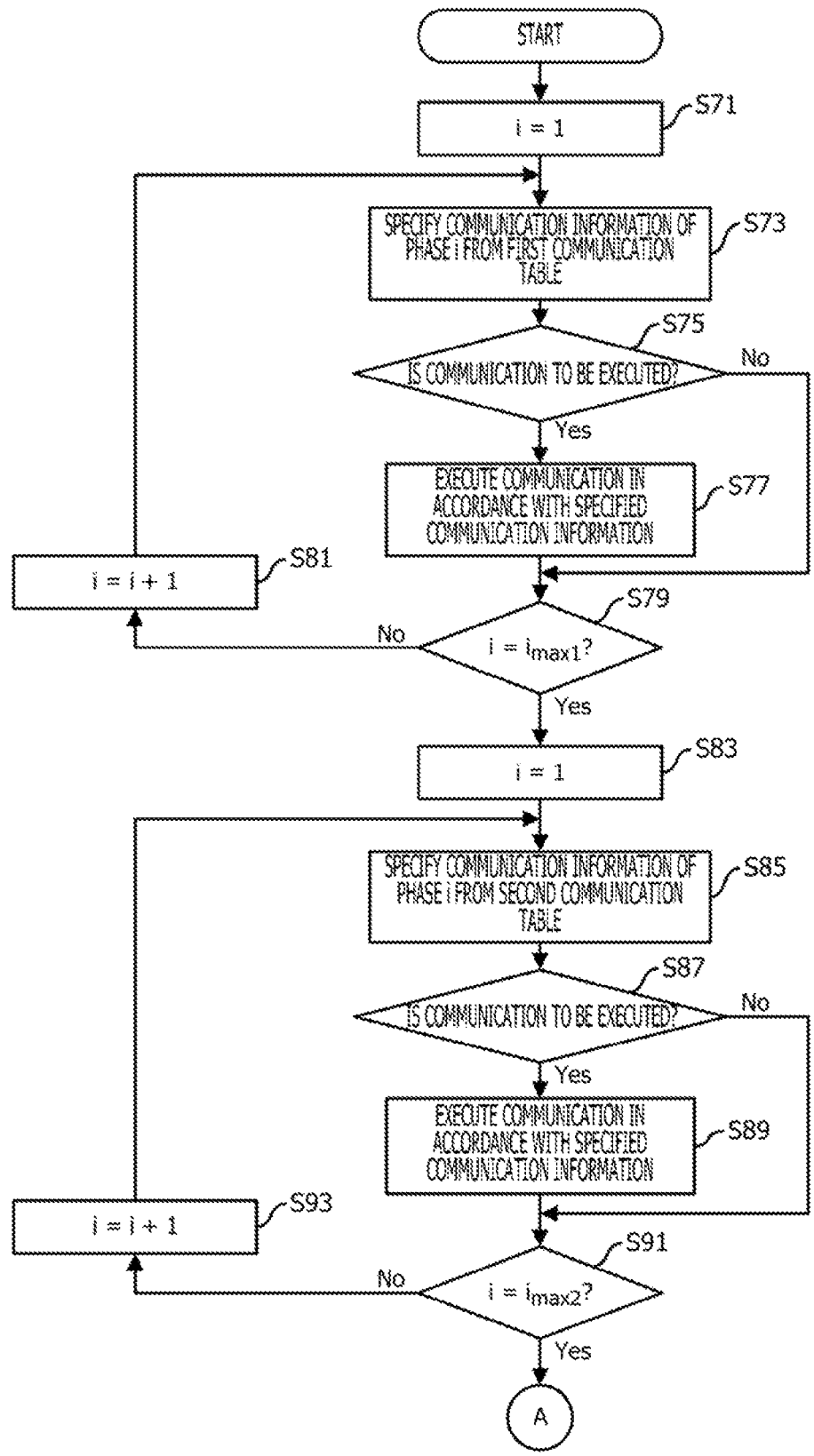
FIGS. 43 to 45 are views depicting a processing flow of a process executed by a server.

FIG. 43 is a flow chart depicting a processing flow of the process executed by a server.

The first communication unit 1011 in the server sets 1 to a variable representative of the phase number (FIG. 43: step S71).

The first communication unit 1011 specifies communication information of the phase i from the first communication table stored in the communication table storage unit 103 (step S73).

The first communication unit 1011 decides whether or not the own server (for example, the server that is executing the present process) is to execute communication in the phase i (step S75). Whether or not the own server is to execute communication in the phase i is decided depending upon whether or not the identification information of the own server is included in the specified communication information.

If the own server is not to execute communication in the phase i (step S75: No route), the processing advances to step S79. On the other hand, if the own server is to execute communication in the phase i (step S75: Yes route), the first communication unit 1011 executes communication in accordance with the communication information specified at step S73 (step S77).

As described hereinabove, the communication performed in accordance with the first communication table is reduce communication between servers coupled to a same Leaf switch, and a server that receives a value from a different server executes arithmetic operation for a reduce.

The first communication unit 1011 decides whether or not $i=i_{max1}$ is satisfied (step S79). $i_{max1}$ is a maximum value of the phase number of communication performed in accordance with the first communication table. If $i=i_{max1}$ is not satisfied (step S79: No route), the first communication unit 1011 increments i by one (step S81). Then, the processing advances to step S73. It is to be noted that the end of the phase is confirmed by barrier synchronism.

On the other hand, if $i=i_{max1}$ is satisfied (step S79: Yes route), the second communication unit 1013 sets 1 to the variable representative of the phase number (step S83).

The second communication unit 1013 specifies communication information of the phase i from the second communication table stored in the communication table storage unit 103 (step S85).

The second communication unit 1013 decides whether or not the own server (for example, the server that is executing the present process) is to execute communication in the phase i (step S87). Whether or not the own server is to execute communication in the phase i is determined depending upon whether the identification information of the own server is included in the specified communication information.

If the own server is not to execute communication in the phase i (step S87: No route), the processing advances to step S91. On the other hand, if the own server is to execute communication in the phase i (step S87: Yes route), the second communication unit 1013 executes communication in accordance with the communication information specified at step S85 (step S89).

As described hereinabove, the communication performed in accordance with the second communication table is reduce communication between each server coupled to a representative switch and the representative server coupled to a Leaf switch that belongs to a group corresponding to the server, and a server that receives a value from a different server executes arithmetic operation for a reduce.

The second communication unit 1013 decides whether or not $i=i_{max2}$ is satisfied (step S91). $i_{max2}$ is a maximum value of the phase number of communication performed in accordance with the second communication table. If $i=i_{max2}$ is not satisfied (step S91: No route), the second communication unit 1013 increments i by one (step S93). Then, the processing advances to step S85. It is to be noted that the end of the phase is confirmed by barrier synchronism.

On the other hand, if $i=i_{max2}$ is satisfied (step S91: Yes route), the processing advances to step S95 of FIG. 44 through the terminal A.

Figure 44:
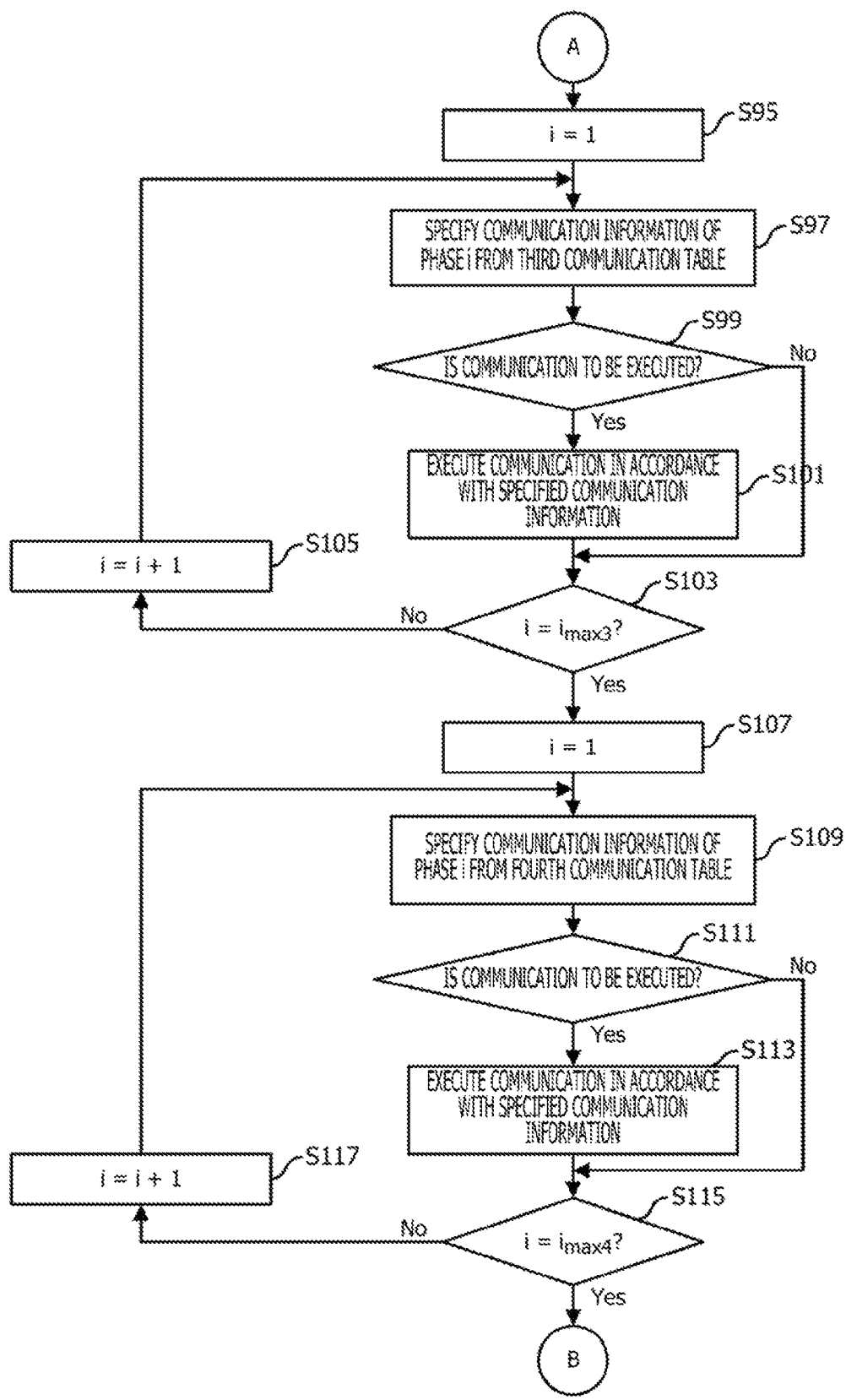

Referring now to FIG. 44, the third communication unit 1015 sets 1 to the variable representative of the phase number (FIG. 44: step S95).

The third communication unit 1015 specifies communication information of the phase i from the third communication table stored in the communication table storage unit 103 (step S97).

The third communication unit 1015 decides whether or not the own server (for example, the server that is executing the present process) is to execute communication in the phase i (step S99). Whether or not the own server is to execute communication in the phase i is decided depending upon whether or not the identification information of the own server is included in the specified communication information.

If the own server is not to execute communication in the phase i (step S99: No route), the processing advances to step S103. On the other hand, if the own server is to execute communication in the phase i (step S99: Yes route), the third communication unit 1015 executes communication in accordance with the communication information specified at step S97 (step S101).

As described hereinabove, the communication performed in accordance with the third communication table is Allreduce communication between servers coupled to a representative switch, and each server executes arithmetic operation for Allreduce.

The third communication unit 1015 decides whether or not $i=i_{max3}$ is satisfied (step S103). $i_{max3}$ is a maximum value of the phase number of communication performed in accordance with the third communication table. If $i=i_{max3}$ is not satisfied (step S103: No route), the third communication unit 1015 increments i by one (step S105). Then, the processing advances to step S97. It is to be noted that the end of the phase is confirmed by barrier synchronism.

On the other hand, if $i=i_{max3}$ is satisfied (step S103: Yes route), the fourth communication unit 1017 sets 1 to the variable representative of the phase number (step S107).

The fourth communication unit 1017 specifies communication information of the phase i from the fourth communication table stored in the communication table storage unit 103 (step S109).

The fourth communication unit 1017 decides whether or not the own server (for example, the server that is executing the present process) is to execute communication in the phase i (step S111). Whether or not the own server is to execute communication in the phase i is decided depending upon whether or not the identification information of the own server is included in the specified communication information.

If the own server is not to execute communication in the phase i (step S111: No route), the processing advances to step S115. On the other hand, if the own server is to execute communication in the phase i (step S111: Yes route), the fourth communication unit 1017 executes communication in accordance with the communication information specified at step S109 (step S113).

As described hereinabove, the communication performed in accordance with the fourth communication table is result distribution from each server coupled to a representative switch to a representative server coupled to a Leaf switch belonging to a group corresponding to the server.

The fourth communication unit 1017 decides whether or not $i=i_{max4}$ is satisfied (step S115). $i_{max4}$ is a maximum value of the phase number of communication performed in accordance with the fourth communication table. If $i=i_{max4}$ is not satisfied (step S115: No route), the fourth communication unit 1017 increments i by one (step S117). Then, the processing advances to step S109. It is to be noted that the end of the phase is confirmed by barrier synchronism.

On the other hand, if $i=i_{max4}$ is satisfied (step S115: Yes route), the processing advances to step S119 of FIG. 45 through the terminal B.

Figure 45:
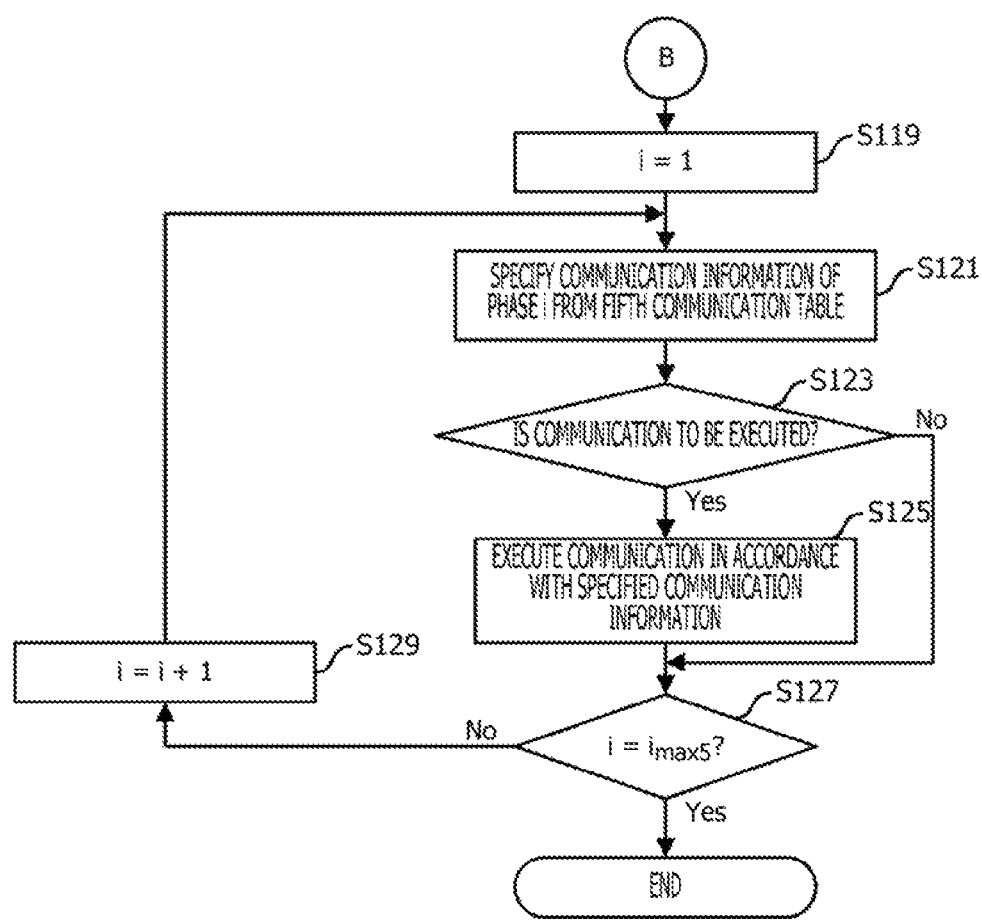

Referring now to FIG. 45, the fifth communication unit 1019 sets 1 to the variable representative of the phase number (FIG. 45: step S119).

The fifth communication unit 1019 specifies communication information of the phase i from the fifth communication table stored in the communication table storage unit 103 (step S121).

The fifth communication unit 1019 decides whether or not the own server (for example, the server that is executing the present process) is to execute communication in the phase i (step S123). Whether or not the own server is to execute communication in the phase i is decided depending upon whether or not the identification information of the own server is included in the specified communication information.

If the own server is not to execute communication in the phase i (step S123: No route), the processing advances to step S127. On the other hand, if the own server is to execute communication in the phase i (step S123: Yes route), the fifth communication unit 1019 executes communication in accordance with communication information specified at step S121 (step S125).

As described above, the communication performed in accordance with the fifth communication table is result distribution from each representative server to a different server coupled to a Leaf switch same as that coupled to the representative server.

The fifth communication unit 1019 decides whether or not $i=i_{max5}$ is satisfied (step S127). $i_{max5}$ is a maximum value of the phase number of communication performed in accordance with the fifth communication table. If $i=i_{max5}$ is not satisfied (step S127: No route), the fifth communication unit 1019 increments i by one (step S129). Then, the processing advances to step S121. It is to be noted that the end of the phase is confirmed by barrier synchronism.

On the other hand, if $i=i_{max5}$ is satisfied (step S127: Yes route), the processing ends.

If such processes as described above are executed, it is possible to implement Allreduce by all servers of the Latin square fat-tree system 1000. Therefore, parallel distributed processing that uses a greater number of servers may be executed by the Latin square fat-tree system 1000.

As described hereinabove, in the present embodiment, route competition does not occur in the procedure of Allreduce communication.

Further, with the method of the present embodiment, Allreduce may be executed by a calculation amount of approximately O (log N) (N is the number of all servers in the Latin square fat-tree system 1000). It is to be noted that, in the present embodiment, N=52.

While the embodiment of the present technology is described above, the preset technology is not limited to this. For example, the functional block configurations of the management apparatus 3 and the servers described hereinabove may not coincide with an actual program module configuration.

Further, the configuration of each table described hereinabove is an example and may not necessarily be such a configuration as described hereinabove. Furthermore, also in each processing flow, the order of processes may be changed if a result of the processing does not vary. Furthermore, the processes may be executed in parallel.

Further, although, in the example described hereinabove, addition is performed as the arithmetic operation of Allreduce and a reduce, some other arithmetic operation than addition (for example, multiplication) may be performed.

Further, although, in the first generation process and the second generation process, a communication table relating to reduces is generated, a communication table for Allreduce may be generated.

Appendix

In the present appendix, a Latin square fat-tree and a finite projection plane are described with reference to FIGS. 46 to 49.

Figure 46:
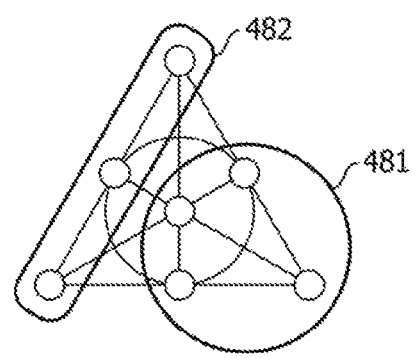
FIGS. 46 to 49 are views illustrating a Latin square fat-tree and a finite projection plane.
Figure 47:
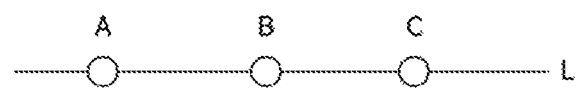
Figure 47:
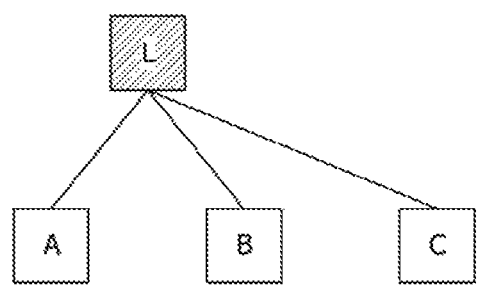
Figure 48:
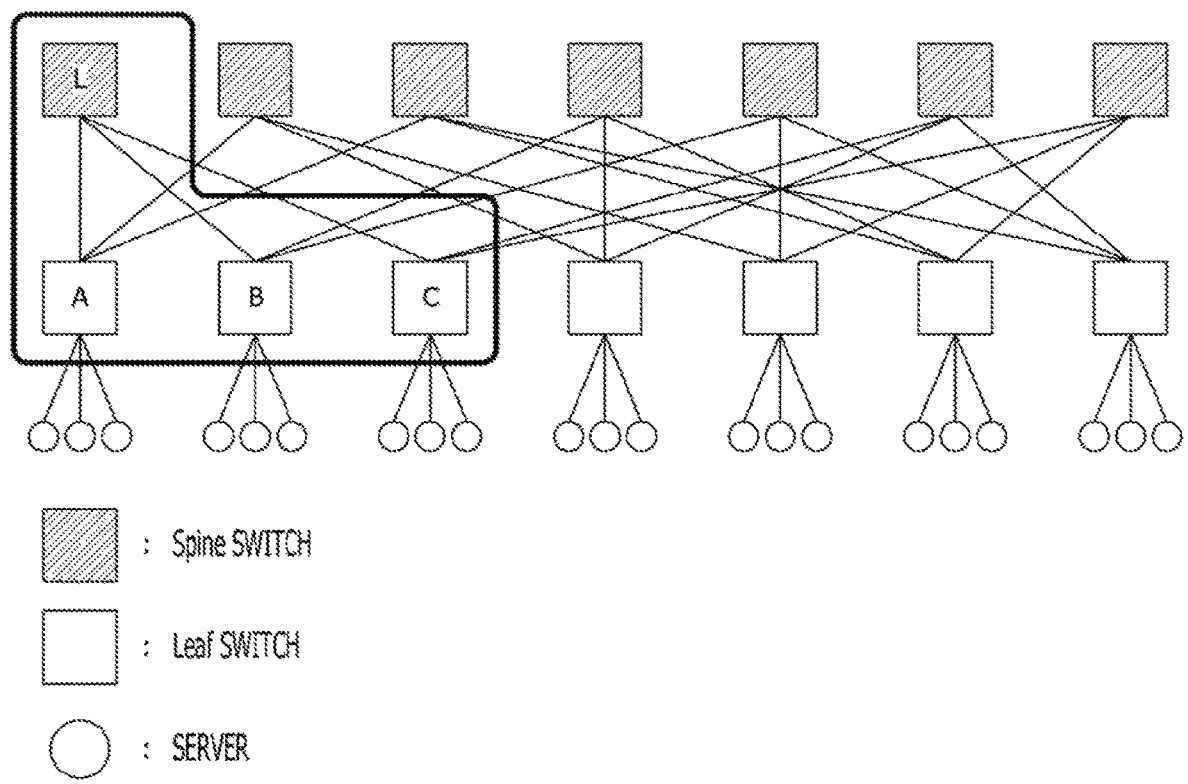
Figure 48:
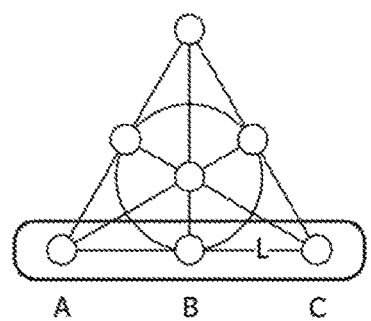

The finite projection plane corresponds to a plane formed by adding several finite points to an ordinary plane without permitting presence of "two parallel straight lines." FIG. 46 depicts a structure of a finite projection plane in the case where the order (hereinafter represented by n) is 2 and the number of ports is 6(=2(n+1)). In FIG. 46, 3(=n+1) Leaf switches surrounded by a frame 482 correspond to finite points.

In the finite projection plane, one point P is set and n points P(c) (c=0, 1, ..., n−1) are set, and $n^2$ points P(c, r) (c,r=0, 1, ..., n−1) are set. Further, one straight line L={P, P(0), ..., P(n−1)} is set and n straight lines L={P, P(c, 0), ..., P(c, n−1)} (c=0, 1, ..., n−1) are set, and $n^2$ straight lines L(c, r)={P(c) and P(i, (r+ci) mod n)} (i, c, r=0, 1, ..., n−1) are set.

The finite projection plane is characterized in that ($n^2$+n+1) points exist and the number of straight lines is ($n^2$+n+1). Two arbitrary straight lines cross at one point with each other, and two arbitrary points are coupled by only one straight line. However, there is a restriction that n is a prime number.

The structure of the finite projection plane is replaced by a topology structure. For example, the structure of a finite projection plane depicted in FIG. 47A is replaced by a topology structure depicted in FIG. 47B. In FIG. 47A, a straight line represents a Spine switch, and a round mark represents a Leaf switch. In FIG. 47B, a rectangle indicated by slanting lines represents a Spine switch, and a rectangle having no slanting lines applied thereto represents a Leaf switch.

A topology structure depicted in FIG. 48A is a topology structure of a Latin square fat-tree, in which the number of Spine switches is 7, and the number of Leaf switches is 7 and corresponds to a structure of a finite projection plane depicted in FIG. 48B. The topology structure of a portion surrounded by a thick line in FIG. 48A is same as the topology structure of FIG. 47B. Further, the structure of a portion surrounded by a thick line in FIG. 48B corresponds to the topology structure of a portion surrounded by a thick line in FIG. 48A.

Figure 49:
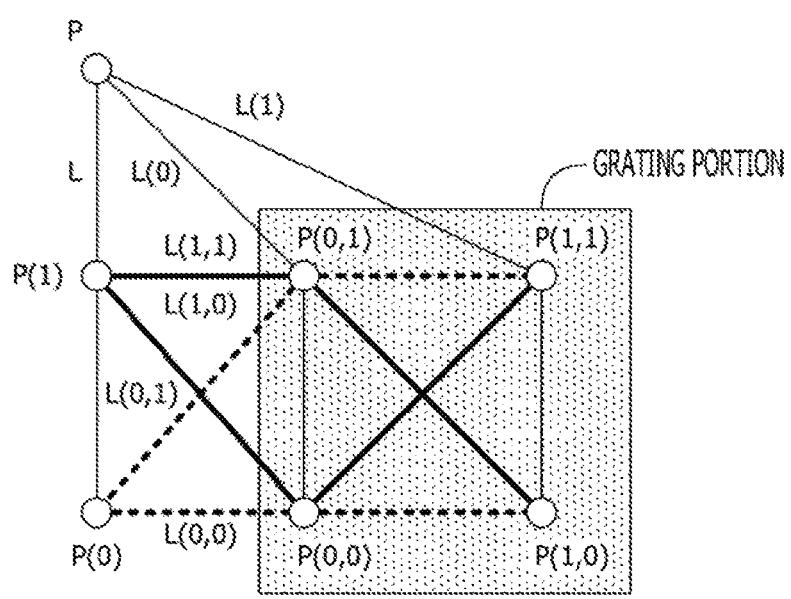

The structure depicted in FIG. 46 may be converted into a structure depicted in FIG. 49. Referring to FIG. 49, four (=n*n) Leaf switches included in a grating portion indicated by dots correspond to four Leaf switches included in a portion surrounded by a frame 481 in FIG. 46. Parallel straight line groups in the grating portion are converted such that they cross with each other at additional points. For example, the parallel straight lines are converted such that straight line groups having an equal inclination cross with each other.

The appendix ends therewith.

Figure 50:
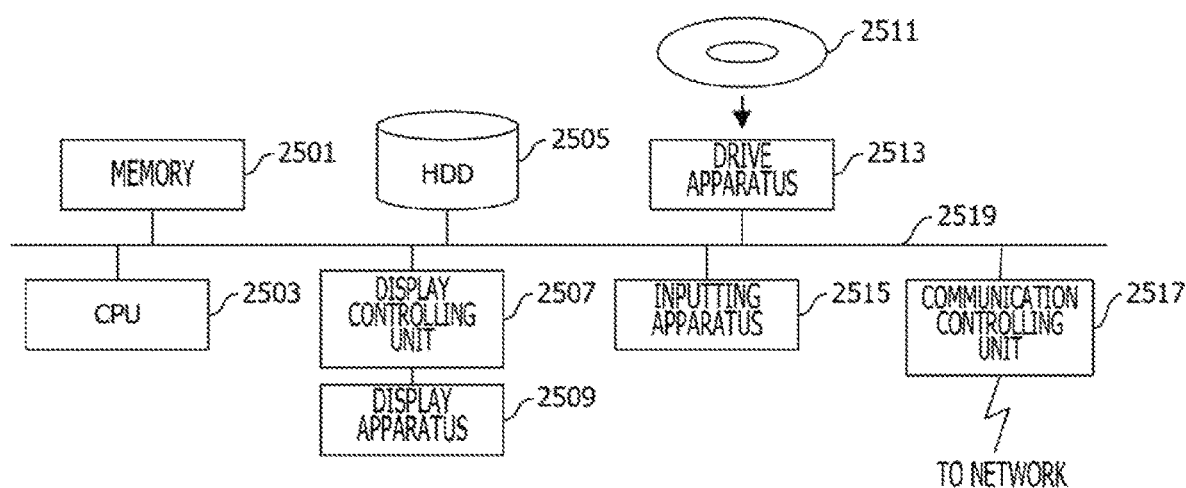
FIG. 50 is a functional block diagram of a computer.

FIG. 50 is a functional block diagram of a computer. It is to be noted that the management apparatus 3 and the servers described hereinabove are each a computer apparatus and includes, as depicted in FIG. 50, a memory 2501, a central processing unit (CPU) 2503, a hard disk drive (HDD) 2505, a display controlling unit 2507 coupled to a display apparatus 2509, a drive apparatus 2513 for a removable disk 2511, an inputting apparatus 2515 and a communication controlling unit 2517 for coupling to a network, coupled to each other by a bus 2519. An operating system (OS) and an application program for carrying out the processes in the present embodiment are stored in the HDD 2505 and read out from the HDD 2505 into the memory 2501 when they are to be executed by the CPU 2503. The CPU 2503 controls the display controlling unit 2507, communication controlling unit 2517 and drive apparatus 2513 in accordance with the processing substance of the application program such that they perform given operation. Although data during processing are principally stored into the memory 2501, they may be stored into the HDD 2505. In the embodiment of the present technology, the application program for carrying out the processes described hereinabove is stored into and distributed together with a computer-readable removable disk 2511 and installed from the drive apparatus 2513 into the HDD 2505. The application program may be installed into the HDD 2505 through a network such as the Internet and the communication controlling unit 2517. Such a computer apparatus as described above implements such various functions as described above through organic collaboration of hardware such as the CPU 2503 and the memory 2501 described above with the OS and programs such as the application program described above.

Figure 51:
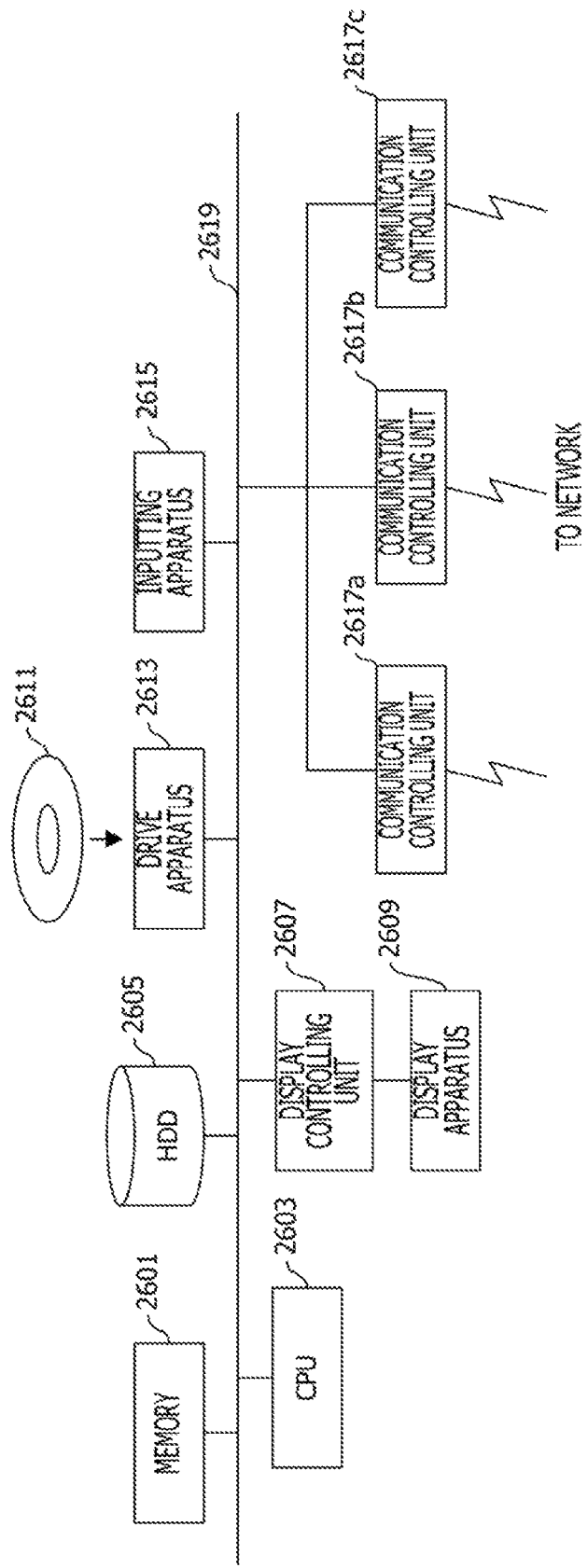
FIG. 51 is a functional block diagram of a switch.

FIG. 51 is a functional block diagram of a switch. The Leaf switches and the Spine switches described above may each have such a configuration as depicted in FIG. 51. In the configuration of FIG. 51, a memory 2601, a CPU 2603, a HDD 2605, a display controlling unit 2607 coupled to a display apparatus 2609, a drive apparatus 2613 for a removable disk 2611, an inputting apparatus 2615, a communication controlling unit 2617 (in FIGS. 51, 2617a to 2617c) for coupling to a network are coupled to each other by a bus 2619. It is to be noted that, in some cases, the display controlling unit 2607, display apparatus 2609, drive apparatus 2613 and inputting apparatus 2615 may not be included in the configuration. An OS and an application program for carrying out the processes in the present embodiment are stored in the HDD 2605 and are read out from the HDD 2605 into the memory 2601 when they are to be executed by the CPU 2603. As occasion demands, the CPU 2603 controls the display controlling unit 2607, communication controlling unit 2617 and drive apparatus 2613 to perform given operation. It is to be noted that data inputted through one of the communication controlling units 2617 is outputted from a different one of the communication controlling units 2617. The CPU 2603 controls the communication controlling units 2617 to change over the output destination appropriately. Data during processing is stored into the memory 2601 or is stored into the HDD 2605 if this is appropriate. In the embodiment of the present technology, the application program for carrying out the processes described above is stored into and distributed together with a computer-readable removable disk 2611 and is installed from the drive apparatus 2613 into the HDD 2605. The application program may be installed into the HDD 2605 through a network such as the Internet and the communication controlling unit 2617. Such a computer apparatus as just described implements such various functions as described above through organic collaboration of such hardware as the CPU 2603 and the memory 2601 described above with the OS and the given application program.

The embodiment of the present technology described above may be concluded as described below.

An information processing system according to a first aspect of the present embodiment includes a plurality of switches (Leaf switches in the embodiment are an example of the switches) whose coupling form is a Latin square fat-tree, and a plurality of information processing apparatuses (servers in the embodiment are an example of the information processing apparatuses) individually coupled to several ones of the plurality of switches. Further, (A) each of information processing apparatuses coupled to a switch other than a representative switch corresponding to a specific one point on a finite projection plane corresponding to the Latin square fat-tree executes a first reduce with a different information processing apparatus coupled to a same switch to which the information processing apparatus is coupled, a result of the first reduce being had by a representative information processing apparatus from among information processing apparatuses coupled to the same switch; (B) each of the information processing apparatuses coupled to the representative switch executes a second reduce with the representative information processing apparatus of each switch belonging to a group corresponding to the information processing apparatus, a result of the second reduce being had by the information processing apparatus; (C) the information processing apparatus coupled to the representative switch executes Allreduce based on a result of the second reduce; (D) each of the information processing apparatuses coupled to the representative switch transmits a result of the Allreduce to the representative information processing apparatus of each switch belonging to a group corresponding to the information processing apparatus; and (E) each of the representative information processing apparatuses, which receives a result of the Allreduce, transmits a result of the Allreduce to a different information processing apparatus coupled to the same switch to which the representative information processing apparatus is coupled.

Where the information processing system is configured in such a manner as described above, it becomes possible to execute Allreduce in which all of the information processing apparatuses in the Latin square fat-tree system participate.

Further, the specific one point may be an infinite point on the finite projection plane.

Further, a plurality of switches corresponding to a plurality of points on a same straight line on the finite projection plane may belong to a same group.

It becomes possible to efficiently perform communication.

Further, each of the information processing apparatuses in a switch other than the representative switch may (a1) transmit, in a phase in which the information processing apparatus transmits data from among phases of communication of the first reduce, the data to an information processing apparatus that does not receive other data from other information processing apparatuses.

Where the information processing system is configured in this manner, it becomes possible to suppress occurrence of route competition in communication of the first reduce.

Each of the information processing apparatuses coupled to the representative switch may (b1) receive data from one representative information processing apparatus in each phase of the second reduce.

Where the information processing system is configured in this manner, it becomes possible to suppress occurrence of route competition in communication of the second reduce.

Further, each of the information processing apparatuses coupled to the representative switch may (c1) transmit, in a phase in which the information processing apparatus transmits data from among phases of communication of the Allreduce, the data to an information processing apparatus that does not receive other data from other information processing apparatuses.

Where the information processing system is configured in this manner, it becomes possible to suppress occurrence of route competition in the Allreduce executed by the information processing apparatuses coupled to the representative switch.

Further, each of the information processing apparatuses coupled to the representative switch may (d1) transmit, in each phase of communication in which a result of the Allreduce is transmitted to each representative information processing apparatus of switches belonging to a group corresponding to the information processing apparatus, a result of the Allreduce to an information processing apparatus that does not receive other data from other information processing apparatuses.

It becomes possible to suppress occurrence of route competition in communication in which a result of the Allreduce is transmitted from the information processing apparatus coupled to the representative switch to the representative information processing apparatuses.

Further, each of the representative information processing apparatuses that receive a result of the Allreduce may (e1) transmit, in each phase of communication in which a result of the Allreduce is transmitted to a different information processing apparatus coupled to a same switch to which the representative information processing apparatus is coupled, a result of the Allreduce to an information processing apparatus that does not receive other data from other information processing apparatuses.

It becomes possible to suppress occurrence of route competition in communication in which a result of the Allreduce is transmitted from the representative information processing apparatus to other information processing apparatuses.

An information processing method according to a second aspect of the present embodiment is executed in an information processing system that includes a plurality of switches whose coupling form is a Latin square fat-tree and a plurality of information processing apparatuses individually coupled to several ones of the plurality of switches. The present information processing method includes processes for (F) executing, by each information processing apparatus coupled to a switch other than a representative switch corresponding to a specific one point on a finite projection plane corresponding to the Latin square fat-tree, a first reduce with a different information processing apparatus coupled to a same switch to which the information processing apparatus is coupled, a result of the first reduce being had by a representative information processing apparatus from among information processing apparatuses coupled to the same switch, (G) executing, by each of information processing apparatuses coupled to the representative switch, a second reduce with the representative information processing apparatus of each switch belonging to a group corresponding to the information processing apparatus, a result of the second reduce being had by the information processing apparatus, (H) executing, by the information processing apparatus coupled to the representative switch, Allreduce based on a result of the second reduce, (I) transmitting, by each of the information processing apparatuses coupled to the representative switch, a result of the Allreduce to the representative information processing apparatus of each switch belonging to a group corresponding to the information processing apparatus, and (J) transmitting, by each of the representative information processing apparatuses that receive a result of the Allreduce, a result of the Allreduce to a different information processing apparatus coupled to the same switch to which the representative information processing apparatus is coupled.

Where the information processing method is configured in such a manner as described above, it becomes possible to execute Allreduce in which all of the information processing apparatuses in the Latin square fat-tree system participate.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing system, comprising:
a plurality of switches coupled to each other in a form of a Latin square fat-tree; and
a plurality of information processing apparatuses individually coupled to any one of the plurality of switches and each including a processor configured to:
execute, in a case where the processor is included in one of first information processing apparatuses coupled to one of first switches, a first reduce of performing a predetermined operation with others of the first information processing apparatuses, a result of the first reduce being had by a representative information processing apparatus of the first information processing apparatuses, the first switches being different from a representative switch corresponding to a specific one point on a finite projection plane corresponding to the Latin square fat-tree;
execute, in a case where the processor is included in one of second information processing apparatuses coupled to the representative switch, a second reduce of performing the predetermined operation with representative information processing apparatuses of respective switches belonging to a group corresponding to the one of the second information processing apparatuses, a result of the second reduce being had by the one of the second information processing apparatuses;
execute, in a case where the processor is included in the one of the second information processing apparatuses, Allreduce of performing the predetermined operation with others of the second information processing apparatuses based on the result of the second reduce, a result of the Allreduce being had by the one of the second information processing apparatuses;
transmit, in a case where the processor is included in the one of the second information processing apparatuses, the result of the Allreduce to the representative information processing apparatuses of the respective switches belonging to the group corresponding to the one of the second information processing apparatuses; and
transmit, in a case where the processor is included in one of the representative information processing apparatuses that receive the result of the Allreduce, the result of the Allreduce to others of information processing apparatuses coupled to a switch to which the one of the representative information processing apparatuses is coupled.

2. The information processing system according to claim 1, wherein
the specific one point is an infinite point on the finite projection plane.

3. The information processing system according to claim 1, wherein
a plurality of switches corresponding to a plurality of points on a same straight line on the finite projection plane belong to a same group.

4. The information processing system according to claim 1, wherein
the processor is configured to:
transmit, in a case where the processor is included in an information processing apparatus coupled to one of the plurality of switches other than the representative switch, data to an information processing apparatus that does not receive other data from other information processing apparatuses in a phase of transmitting data in the first reduce.

5. The information processing system according to claim 1, wherein
the processor is configured to:
receive, in a case where the processor is included in one of the information processing apparatuses coupled to the representative switch, data from one representative information processing apparatus in each phase of the second reduce.

6. The information processing system according to claim 1, wherein
the processor is configured to:
transmit, in a case where the processor is included in one of the information processing apparatuses coupled to the representative switch, data to an information processing apparatus that does not receive other data from other information processing apparatuses in a phase of transmitting data in the Allreduce.

7. The information processing system according to claim 1, wherein
the processor is configured to:
transmit, in a case where the processor is included in one of the information processing apparatuses coupled to the representative switch, the result of the Allreduce to an information processing apparatus that does not receive other data from other information processing apparatuses in a phase of transmitting the result of the Allreduce.

8. The information processing system according to claim 1, wherein
the processor is configured to:
transmit, in a case where the processor is included in one of the representative information processing apparatuses that receive the result of the Allreduce, the result of the Allreduce to an information processing apparatus that does not receive other data from other information processing apparatuses in a phase of transmitting the result of the Allreduce.

9. An information processing method, comprising:

executing, by a processor included in one of first information processing apparatuses coupled to one of first switches of a plurality of switches, a first reduce of performing a predetermined operation with others of the first information processing apparatuses, a result of the first reduce being had by a representative information processing apparatus of the first information processing apparatuses, the plurality of switches being coupled to each other in a form of a Latin square fat-tree, the first switches being different from a representative switch of the plurality of switches, the plurality of information processing apparatuses being individually coupled to any one of the plurality of switches, the representative switch corresponding to a specific one point on a finite projection plane corresponding to the Latin square fat-tree;

executing, by a processor included in one of second information processing apparatuses coupled to the representative switch, a second reduce of performing the predetermined operation with representative information processing apparatuses of respective switches belonging to a group corresponding to the one of the second information processing apparatuses, a result of the second reduce being had by the one of the second information processing apparatuses;

executing, by the processor included in the one of the second information processing apparatuses, Allreduce of performing the predetermined operation with others of the second information processing apparatuses based on the result of the second reduce, a result of the Allreduce being had by the one of the second information processing apparatuses;

transmitting, by the processor included in the one of the second information processing apparatuses, the result of the Allreduce to the representative information processing apparatuses of the respective switches belonging to the group corresponding to the one of the second information processing apparatuses; and transmitting, by a processor included in one of the representative information processing apparatuses that receive the result of the Allreduce, the result of the Allreduce to others of information processing apparatuses coupled to a switch to which the one of the representative information processing apparatuses is coupled.

10. A management apparatus, comprising:

a memory to store a network topology of a Latin square fat tree system including a plurality of Leaf switches, a plurality of Spine switches, and a plurality of servers; and a processor coupled to the memory and the processor configured to:

generate, based on the network topology, a plurality of communication tables that include identification information of the servers and information to allow the plurality of servers to perform an Allreduce communication operation in which data stored in each server is shared among all servers in the plurality of servers; and transmitting the plurality of communication tables to the plurality of servers.

11. The management apparatus according to claim 10, wherein the plurality of communication tables includes a communication table that includes identification information of a server that executes communication in each phase of a reduce in the Leaf switches other than a representative switch.

* * * * *